United States Patent
Sinha et al.

(10) Patent No.: US 12,293,293 B2
(45) Date of Patent: May 6, 2025

(54) MACHINE LEARNING USING STRUCTURALLY REGULARIZED CONVOLUTIONAL NEURAL NETWORK ARCHITECTURE

(71) Applicant: Pavel Sinha, Brossard (CA)

(72) Inventors: Pavel Sinha, Brossard (CA); Zeljko Zilic, Verdun (CA); Ioannis Psaromiligkos, Montreal (CA)

(73) Assignee: AARISH TECHNOLOGIES, Brossard (CA)

( * ) Notice: Subject to any disclaimer, the term of this patent is extended or adjusted under 35 U.S.C. 154(b) by 1043 days.

(21) Appl. No.: 17/280,846

(22) PCT Filed: Sep. 30, 2019

(86) PCT No.: PCT/IB2019/001071
§ 371 (c)(1),
(2) Date: Mar. 26, 2021

(87) PCT Pub. No.: WO2020/065403
PCT Pub. Date: Apr. 2, 2020

(65) Prior Publication Data
US 2022/0004810 A1    Jan. 6, 2022

Related U.S. Application Data

(60) Provisional application No. 62/837,957, filed on Apr. 24, 2019, provisional application No. 62/737,960, filed on Sep. 28, 2018.

(51) Int. Cl.
*G06N 3/08*         (2023.01)
*G06F 18/214*    (2023.01)
(Continued)

(52) U.S. Cl.
CPC ........... *G06N 3/084* (2013.01); *G06F 18/214* (2023.01); *G06N 3/045* (2023.01); *G06N 3/0464* (2023.01);
(Continued)

(58) Field of Classification Search
CPC .... G06N 3/045; G06N 3/0455; G06N 3/0464; G06N 3/04; G06N 3/08; G06N 3/0895;
(Continued)

(56) References Cited

U.S. PATENT DOCUMENTS

2005/0265629 A1* 12/2005 Fu ........................... G06F 18/00
382/265

OTHER PUBLICATIONS

Williams et al., "Advanced Image Classification using Wavelets and Convolutional Neural Networks", 2016 15th IEEE International Conference on Machine Learning and Applications (ICMLA), Dec. 20, 2016 (Dec. 20, 2016). 7 pages. (Year: 2016).*
(Continued)

*Primary Examiner* — Paulinho E Smith
(74) *Attorney, Agent, or Firm* — LOZA & LOZA, LLP; Gabriel Fitch

(57) ABSTRACT

Machine learning architectures to perform pattern recognition such as a structurally regularized convolutional neural network architecture, along with corresponding methods of operation, are provided. One such architecture includes a memory, and a processor coupled to the memory, where the processor receives data including a pattern to be recognized, decomposes the data into of sub-bands, and processes each of the sub-bands with a respective convolutional neural network (CNN) to generate outputs, where each of the CNNs operates independently of the other CNNs. The processor aggregates the outputs of the CNNs, and trains, using the aggregated output, the CNNs to recognize the pattern.

40 Claims, 24 Drawing Sheets

(51) Int. Cl.
*G06N 3/045* (2023.01)
*G06N 3/0464* (2023.01)
*G06N 3/084* (2023.01)
*G06V 10/44* (2022.01)
*G06V 10/52* (2022.01)
*G06V 10/82* (2022.01)

(52) U.S. Cl.
CPC .............. *G06N 3/08* (2013.01); *G06V 10/454* (2022.01); *G06V 10/52* (2022.01); *G06V 10/82* (2022.01)

(58) Field of Classification Search
CPC .......... G06N 3/09; G06N 3/091; G06N 3/092; G06N 3/094; G06N 3/096; G06N 3/098; G06N 3/0985; G06V 10/454; G06V 10/82; G06V 10/513; G06V 10/52
See application file for complete search history.

(56) References Cited

OTHER PUBLICATIONS

Kim et al., "Building Encoder and Decoder with Deep Neural Networks: On the Way to Reality", arXiv:1808.02401v1, Aug. 7, 2018, 14 pages. (Year: 2018).*

Williams, T. et al., Advanced Image Classification using Wavelets and Convolutional Neural Networks, 2016 15th IEEE International Conference on Machine Learning and Applications (ICMLA), Dec. 20, 2016 (Dec. 20, 2016). 7 pages.

Khan, S. et al., Regularization of Deep Neural Networks with Spectral Dropout, arXiv:1711.08591v1, Nov. 23, 2017 (Nov. 23, 2017). 9 pages.

Kim et al., Building Encoder and Decoder with Deep Neural Networks: On the Way to Reality, arXiv:1808.02401v1, Aug. 7, 2018 (Jul. 8, 2018). 14 pages.

PCT/IB2019/001071. International Search Report & Written Opinion (Feb. 17, 2020). 8 pages.

* cited by examiner

MACHINE LEARNING USING STRUCTURALLY REGULARIZED CONVOLUTIONAL NEURAL NETWORK ARCHITECTURE

CROSS-REFERENCE TO RELATED APPLICATION(S)

This application claims priority to and the benefit of International Patent Cooperation Treaty No. PCT/IB2019/001071, filed Sep. 30, 2019, which claims priority to and the benefit of U.S. Provisional Application No. 62/737,960 filed on Sep. 28, 2018, and entitled, "Efficient Convolutional-Neural-Network (CNN) Processing System via Sub-Band Decomposition," and U.S. Provisional Application No. 62/837,957 filed on Apr. 4, 2019, and entitled, "Efficient Convolutional-Neural-Network (CNN) Processing System via Sub-Band Decomposition," the entire content of each of which is incorporated herein by reference.

FIELD

The subject matter described herein generally relates to machine learning. More particularly, the subject matter described herein relates to machine learning using a structurally regularized convolutional neural network architecture.

INTRODUCTION

Deep learning, which may also be referred to as deep structured learning or hierarchical learning is part of a broader family of machine learning methods based on artificial neural networks. Learning can be supervised, semi-supervised or unsupervised. Deep learning architectures such as deep neural networks, deep belief networks, recurrent neural networks and convolutional neural networks (CNNs) have been applied to a number of fields, including image classification and natural language processing, where they have produced results comparable to human experts.

Deep neural networks (DNNs), which include CNNs, use a computational approach loosely modelled from biological brains and their use of interconnected neurons to process inputs. DNNs are typically organized in layers made up of interconnected nodes associated with activation functions. An input layer may receive an input, hidden layers may process the input via a system of weighted connections, and an output layer may provide a result. DNNs often include multiple hidden layers between the input and output layers. They are trained using large training sets on large models, making them computationally and memory intensive. There is much interest in DNNs that are capable of providing faster training and test time.

It is well understood in the deep learning community that to capture the wide spectrum of low, mid, and high level representations for deep semantic understanding of complex patterns, networks with many layers and nodes are needed. The success of recent deep learning algorithms (e.g., in processing speech, vision, and natural language) comes in part from the ability to train much larger models on much larger datasets than was previously possible. One fundamental challenge, however, is that, as the dataset size sequences increases, the degree of non-linearity that is involved increases exponentially. This makes it more difficult to capture complex spatiotemporal dependencies, and thus impacts efficiency, training time, and performance.

Since DNNs/CNNs often require several layers of weights to be trained, they are vulnerable to the so called "curse of dimensionality." That is, even with increases in the size of training datasets to include millions of training data items, overfitting remains inevitable. Overfitting results from the production of an analysis that corresponds too closely or exactly to a particular set of data. As a result, the analysis may fail to fit additional data or predict future observations reliably. An overfitted model is a statistical model that contains more parameters than can be justified by the data. The essence of overfitting is to have unknowingly extracted some of the residual variation (i.e. the noise) as if that variation represented underlying model structure. Thus, solutions for training deep neural networks that improve on challenges such as high computational costs and overfitting are needed.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus for pattern recognition, comprising a memory, and a processor coupled to the memory and configured to: receive data comprising a pattern to be recognized; decompose the data into a plurality of sub-bands; process each of the plurality of sub-bands with a respective convolutional neural network (CNN) to generate a plurality of outputs, wherein each of the CNNs operates independently of the other CNNs; aggregate the outputs of the CNNs; and train, using the aggregated output, the CNNs to recognize the pattern.

In one aspect, each of the CNNs is configured to generate a respective output using information from the respective sub-band and without using information from any of the other sub-bands.

In one aspect, the data comprises an image.

In one aspect, the processor is further configured to decompose the data into the plurality of sub-bands such that each of the plurality of sub-bands is equal in size.

In one aspect, the processor is further configured to decompose the data into the plurality of sub-bands using a transform selected from the group consisting of a wavelet transform, an adaptive transform, a loss-less transform, a Fourier transform, a discrete cosine transform, discrete sine transform, a Karhunen-Loève transform, and combinations thereof.

In one aspect, the processor is further configured to decompose the data into the plurality of sub-bands is performed using an adaptive transform; and wherein the processor is further configured to train, using the aggregated output, the adaptive transform.

In one aspect, the processor is further configured to decompose the data into the plurality of sub-bands such that the plurality of sub-bands comprises: low frequency sub-bands have a first average degree of sparsity; and high frequency sub-bands have a second average degree of sparsity and each have a higher frequency than the low frequency sub-bands; and wherein the second average degree of sparsity is higher than the first average degree of sparsity.

In one aspect, the processor is further configured to process, in parallel, each of the plurality of sub-bands with the respective CNN to generate the plurality of outputs.

In one aspect, a first CNN of the respective CNNs comprises a first type of CNN; and a second CNN of the respective CNNs comprises a second type of CNN that is different from the first type of CNN.

In one aspect, the disclosure provides that the processor is further configured to: mix the plurality of sub-bands to form a plurality of mixed sub-bands; and process each of the plurality of mixed sub-bands with the respective CNN to generate the plurality of outputs.

In one aspect, at least one of the plurality of mixed sub-bands comprises information from two or more of the plurality of sub-bands.

In one aspect, the processor is further configured to: learn, using the aggregated output, at least one weight; and process a mixed sub-band of the plurality of mixed sub-bands to generate the plurality of outputs, wherein the mixed sub-band is weighted by the at least one weight.

In one aspect, the disclosure provides that the processor is further configured to: encode each of the plurality of sub-bands with the respective CNN to generate encoded sub-band data; and decode, for each sub-band, the encoded sub-band data with a second respective CNN to generate decoded sub-band data; and combine the decoded sub-band data for each of the sub-bands; and generate, using the combined decoded sub-band data, an output image.

In one aspect, the disclosure provides that a first CNN of the plurality of CNNs comprises a first convolution module comprising a first filter, the first convolution module configured to provide a first convolved output to a next stage module; a second CNN of the plurality of CNNs comprises a second convolution module comprising a second filter, the second convolution module configured to provide a second convolved output to a next stage module; wherein the processor is further configured to: determine a frequency response of each of the first filter and the second filter; determine a degree of correlation between the frequency responses of the first filter and the second filter; determine a convolution of an input and the filter parameters of the first filter to generate the first convolved output; refrain, if the degree of correlation is greater than a pre-selected threshold, from determining a convolution of an input and the filter parameters of the second filter; and provide, if the degree of correlation is greater than the pre-selected threshold, the first convolved output to the next stage module of the second convolution module.

In one aspect, the processor is further configured to determine the degree of correlation between the frequency responses of the first filter and the second filter by: determining a normalized frequency response for each of the first filter and the second filter; determining a magnitude of each of the normalized frequency responses; and determining the degree of correlation between the normalized magnitudes of the frequency responses of the first filter and the second filter.

In one aspect, the processor is further configured to provide, if the degree of correlation is greater than the pre-selected threshold, the first convolved output to the next stage module of the second convolution module by: scaling the first convolved output by a preselected gain; and providing the scaled first convolved output to the next stage module of the second convolution module.

In one aspect, the processor is further configured to determine the degree of correlation between the frequency responses of the first filter and the second filter by: determining a phase response matrix of each of the first filter and the second filter; determining a normalized frequency response for each of the first filter and the second filter; determining a magnitude of each of the normalized frequency responses; and determining the degree of correlation based on the normalized magnitudes of the frequency responses and the phase response matrices of the first filter and the second filter.

In one aspect, the disclosure provides a method for pattern recognition, comprising: receiving data comprising a pattern to be recognized; decomposing the data into a plurality of sub-bands; processing each of the plurality of sub-bands with a respective convolutional neural network (CNN) to generate a plurality of outputs, wherein each of the CNNs operates independently of the other CNNs; aggregating the outputs of the CNNs; and training, using the aggregated output, the CNNs to recognize the pattern.

In one aspect, each of the CNNs is configured to generate a respective output using information from the respective sub-band and without using information from any of the other sub-bands. In one aspect, the data comprises an image.

In one aspect, the decomposing the data into the plurality of sub-bands comprises decomposing the data into the plurality of sub-bands such that each of the plurality of sub-bands is equal in size.

In one aspect, the decomposing the data into the plurality of sub-bands is performed using a transform selected from the group consisting of a wavelet transform, an adaptive transform, a loss-less transform, a Fourier transform, a discrete cosine transform, discrete sine transform, a Karhunen-Loève transform, and combinations thereof.

In one aspect, the decomposing the data into the plurality of sub-bands is performed using an adaptive transform; the method further comprising training, using the aggregated output, the adaptive transform.

In one aspect, the decomposing the data into the plurality of sub-bands comprises decomposing the data into the plurality of sub-bands such that the plurality of sub-bands comprises: low frequency sub-bands have a first average degree of sparsity; and high frequency sub-bands have a second average degree of sparsity and each have a higher frequency than the low frequency sub-bands; and wherein the second average degree of sparsity is higher than the first average degree of sparsity.

In one aspect, the processing each of the plurality of sub-bands with the respective CNN to generate the plurality of outputs comprises processing, in parallel, each of the plurality of sub-bands with the respective CNN to generate the plurality of outputs.

In one aspect, a first CNN of the respective CNNs comprises a first type of CNN; and a second CNN of the respective CNNs comprises a second type of CNN that is different from the first type of CNN.

In one aspect, the method further comprises: mixing the plurality of sub-bands to form a plurality of mixed sub-bands; and wherein the processing each of the plurality of sub-bands with the respective CNN to generate the plurality of outputs comprises processing each of the plurality of mixed sub-bands with the respective CNN to generate the plurality of outputs.

In one aspect, at least one of the plurality of mixed sub-bands comprises information from two or more of the plurality of sub-bands.

In one aspect, the method further comprising: learning, using the aggregated output, at least one weight; and wherein the processing each of the plurality of mixed sub-bands with the respective CNN to generate the plurality of outputs comprises processing a mixed sub-band of the plurality of mixed sub-bands to generate the plurality of outputs, wherein the mixed sub-band is weighted by the at least one weight.

In one aspect, wherein the processing each of the plurality of sub-bands with the respective CNN to generate a plurality of outputs comprises: encoding each of the plurality of sub-bands with the respective CNN to generate encoded sub-band data; and decoding, for each sub-band, the encoded sub-band data with a second respective CNN to generate decoded sub-band data; and wherein the aggregating the outputs of the CNNs comprises: combining the decoded sub-band data for each of the sub-bands; and generating, using the combined decoded sub-band data, an output image.

In one aspect, the disclosure provides the method above: wherein a first CNN of the plurality of CNNs comprises a first convolution module comprising a first filter, the first convolution module configured to provide a first convolved output to a next stage module; wherein a second CNN of the plurality of CNNs comprises a second convolution module comprising a second filter, the second convolution module configured to provide a second convolved output to a next stage module; the method further comprising: determining a frequency response of each of the first filter and the second filter; determining a degree of correlation between the frequency responses of the first filter and the second filter; determining a convolution of an input and the filter parameters of the first filter to generate the first convolved output; refraining, if the degree of correlation is greater than a pre-selected threshold, from determining a convolution of an input and the filter parameters of the second filter; and providing, if the degree of correlation is greater than the pre-selected threshold, the first convolved output to the next stage module of the second convolution module.

In one aspect, the determining the degree of correlation between the frequency responses of the first filter and the second filter comprises: determining a normalized frequency response for each of the first filter and the second filter; determining a magnitude of each of the normalized frequency responses; and determining the degree of correlation between the normalized magnitudes of the frequency responses of the first filter and the second filter.

In one aspect, the providing, if the degree of correlation is greater than the pre-selected threshold, the first convolved output to the next stage module of the second convolution module comprises: scaling the first convolved output by a preselected gain; and providing the scaled first convolved output to the next stage module of the second convolution module.

In one aspect, the determining the degree of correlation between the frequency responses of the first filter and the second filter comprises: determining a phase response matrix of each of the first filter and the second filter; determining a normalized frequency response for each of the first filter and the second filter; determining a magnitude of each of the normalized frequency responses; and determining the degree of correlation based on the normalized magnitudes of the frequency responses and the phase response matrices of the first filter and the second filter.

In one aspect, the disclosure provides a method for computing filters, comprising: determining a frequency response of a first filter of a first convolution module of a first convolutional neural network (CNN), the first convolution module configured to provide a first convolved output to a next stage module; determining a frequency response of a second filter of a second convolution module of a second CNN, the second convolution module configured to provide a second convolved output to a next stage module; determining a degree of correlation between the frequency responses of the first filter and the second filter; determining a convolution of an input and the filter parameters of the first filter to generate the first convolved output; refraining, if the degree of correlation is greater than a pre-selected threshold, from determining a convolution of an input and the filter parameters of the second filter; and providing, if the degree of correlation is greater than the pre-selected threshold, the first convolved output to the next stage module of the second convolution module.

In one aspect, the disclosure provides a method for pattern recognition, comprising: receiving data comprising a pattern to be recognized; decomposing the data into a plurality of sub-bands, wherein each of the plurality of sub-bands is equal in size; combining the plurality of sub-bands; processing the combined sub-bands with a single convolutional neural network (CNN); aggregating output of the CNN; and training, using the aggregated output, the CNN to recognize the pattern.

In one aspect, the decomposing the data into the plurality of sub-bands is performed using a transform selected from the group consisting of a wavelet transform, an adaptive transform, a loss-less transform, a Fourier transform, a discrete cosine transform, discrete sine transform, a Karhunen-Loève transform, and combinations thereof.

In one aspect, the decomposing the data into the plurality of sub-bands is performed using an adaptive transform; the method further comprising: training, using the aggregated output, the adaptive transform.

DETAILED DESCRIPTION

Figure 1:
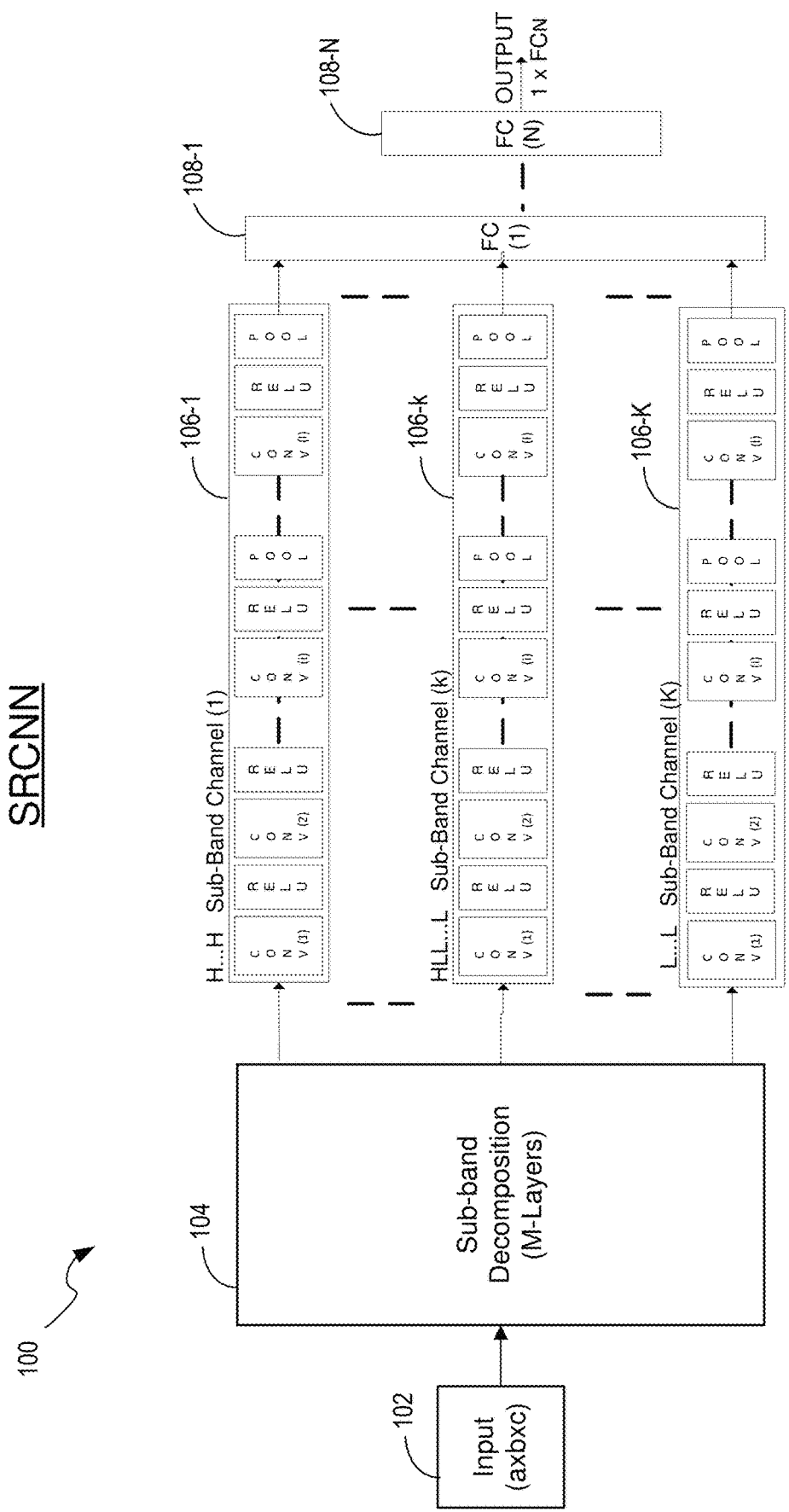
FIG. 1 is a block diagram illustrating an example machine learning architecture including sub-band decomposition and convolutional neural networks (CNNs) in accordance with some aspects of the disclosure.

Referring now to the drawings, machine learning architectures/apparatus configured to perform pattern recognition using a structurally regularized convolutional neural network architecture, along with corresponding methods of operation, are illustrated. One such architecture may be implemented as an apparatus for pattern recognition, including a memory, and a processor coupled to the memory. The processer may be configured to receive data including a pattern to be recognized, decompose the data into a plurality of sub-bands, process each of the plurality of sub-bands with a respective convolutional neural network (CNN) to generate a plurality of outputs, where each of the CNNs operates independently of the other CNNs, aggregate the output of the CNNs, and train, using the aggregated output, the CNNs to recognize the pattern. One example method may perform the same or similar actions.

These machine learning apparatus and methods may reduce computational costs and overfitting. In one aspect, one such machine learning method can first decompose an input image into critically sampled, band-limited sub-bands and then process each of the sub-bands independently with a separate CNN. This proposed technique can emphasize regularization by the virtue of its own structure, thus making it structurally regularized. In one aspect, the proposed technique may inhibit CNNs from training on information available to other sub-bands as a given CNN can only access its' own sub-band information and not the entire spectrum. Further, within each sub-band, each CNN may be subjected to weight regularization. Thus, each of the CNNs may not be able to learn sample-specific features present in the entire spectrum of the input image. This improved regularization can lead to better generalization ability of the network and to reduced over-fitting. The proposed method may not incur any additional computational cost at training, and rather may reduce computational cost by reducing the input image dimension to each of the sub-bands. In one aspect, reductions in computational cost may come from the following: (i) even though the number of CNNs is equal to the number of sub-bands K, the input dimension for each sub-band CNN drops exponentially with K; (ii) the complexity of the CNNs, that process each sub-band independently, drops with the second power of the sub-band input dimensions.

In one aspect, the sub-band decomposition technique is generalized such that instead of learning from the dataset through back propagation, the technique is extended to use the orthogonal basis functions of wavelet decomposition. This can give an added advantage of fixing the weights of the sub-band decomposition filters to achieve computational savings with minor or acceptable loss in classification accuracy. In one aspect, the output of the wavelet decomposition is just a different representation of the input image and may contain exactly the same information present in the input image without any loss.

In this disclosure, the classification accuracy of the proposed sub-band decomposition technique is compared against both a regular full-band CNN architecture and an architecture that computes a discrete wavelet transform (DWT) of the input image and processes it through a single regular CNN. This disclosure also shows the architecture performance when the sub-band decomposition filter structure is fixed (i.e. not learned from the dataset) using wavelet decomposition. The proposed architecture compares favorably to both benchmarks and the results show a negligible/marginal drop in classification accuracy when using wavelet based sub-band decomposition. Specifically, this disclosure shows that the proposed architecture achieves accuracy that is comparable to, if not better, than the state-of-the art, and it generalizes much better than a standard CNN model. This disclosure compares the accuracy of classification using the MNIST, CIFAR-10, CIFAR-100 and Caltech-101 datasets and shows a resulting accuracy of 99.83%, 96.71%, 82.97% and 88.93%, respectively. On the ImageNet-2012 dataset, this disclosure shows achievement of top-5 and top-1 validation set accuracy with 82.17% and 65.6%, respectively. Further, this disclosure shows that these results can be achieved with less than 10% of the computations in the inference path and only 25% of the computations in the back-propagation path as compared to a full-band standard CNN.

First Example Machine Learning Architecture

FIG. 1 is a block diagram illustrating an example machine learning architecture 100 including sub-band decomposition and convolutional neural networks (CNNs) in accordance with some aspects of the disclosure. The machine learning architecture 100 includes an input 102, a sub-band decomposition block 104, multiple sub-band channels (106-1, 106-$k$ . . . 106-K) in parallel, and multiple fully connected (FC) layers (108-1 . . . 108-N) in serial. Each of the sub-band-channels (106-1, 106-$k$ . . . 106-K) corresponds to a single sub-band of the input 102 and includes one CNN. Each of the CNNs operates independently (e.g., effectively isolated) of the other CNNs of the machine learning architecture 100. For example, the CNN of sub-band channel (1) 106-1 operates independently of the CNNs of sub-band channels 106-$k$ and 106-K.

In one aspect, the machine learning architecture 100 may be referred to as a M-layer SRCNN, parametrized by input dimensions a×b×c, the number of sub-bands K, the convolutional layers per sub-band I, the FC layers N and output classes $FC_N$, all open to optimization.

In operation, the sub-band decomposition block 104 may have up to M layers and divides (e.g., decomposes) the input (e.g., data such as an image or input image spectra) 102 into the K sub-bands represented by the sub-band channels 106-$x$. In one aspect, the K sub-bands may be divided equally. In one aspect, the K sub-bands may be divided unequally.

In one aspect, in the first stage (e.g., the sub-band decomposition block 104), the input image can be decomposed into the sub-bands (106-1, 106-$k$ . . . 106-K) using a two dimensional (2D) discrete wavelet transform (2D-DWT).

Figure 2:
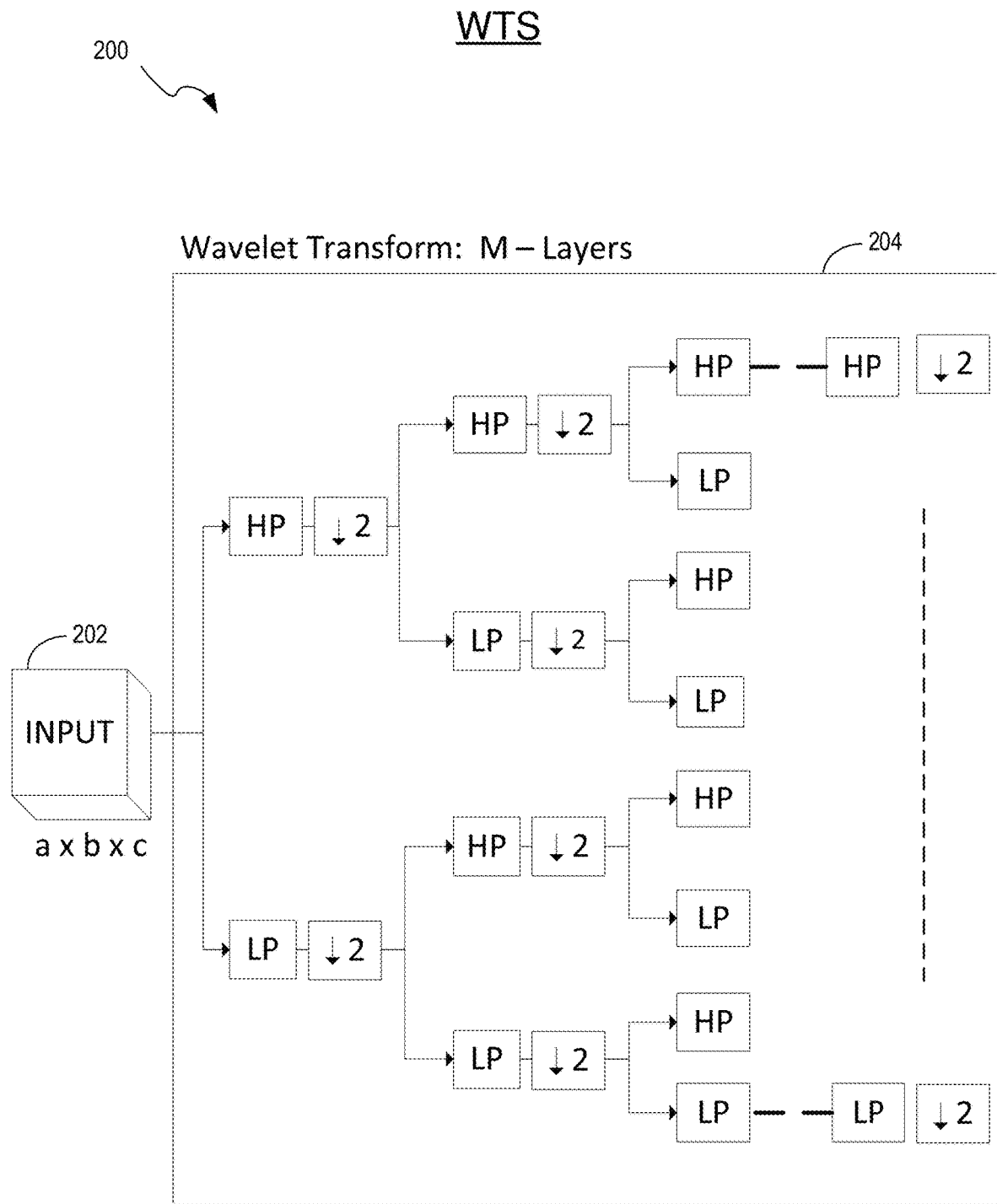
FIG. 2 is a block diagram illustrating an example sub-band decomposition architecture including a wavelet transform in accordance with some aspects of the disclosure.

FIG. 2 is a block diagram illustrating an example sub-band decomposition architecture 200 including a wavelet transform 204 in accordance with some aspects of the disclosure. The wavelet transform 204 can be used to decompose the input 202 into multiple sub-bands (e.g., K sub-bands).

In some aspects, the sub-band decomposition block 104 can decompose the input image 102 using a transform other than the wavelet transform. For example, other suitable transforms may include an adaptive transform, a loss-less adaptive transform, a Fourier transform, a discrete cosine transform, a discrete sine transform, a Karhunen-Loève Transform (KLT), or another suitable transform. At least some of these transforms are discussed in further detail below.

Returning to FIG. 1, and as discussed above, the machine learning architecture 100 can operate by processing each of the sub-bands separately by individual CNNs. The field of view of each CNN may then be restricted to a single dedicated sub-band, making each CNN indifferent to the rest of the sub-bands. Importantly, this sub-band decomposition structure can reduce the overall computational cost. The complete decomposition of the input image Xin into K sub-bands can be mathematically represented by:

$$(X_0^{\{1\}}, \ldots, X_1^{\{K\}}) = DWT(X_{in}, K, M) \tag{1}$$

where M is the number of DWT layers, K is the number of sub-bands, and $X_0^k$ (k=1, . . . , K) are the DWT coefficients for the kth sub-band. The Daubechies (D2) family of basis functions for DWT was chosen. In one aspect, this constitutes the simplest Daubechies wavelet basis, with a single vanishing moment. Being symmetric, they offer linear phase characteristics and do not suffer from edge effect characteristics of higher order wavelets.

The machine learning architecture of FIG. 1 with the wavelet transform of FIG. 2 represents a generalized structure. The exact configuration of the architecture implemented in this disclosure is given by the parameters in Table 1, which follows.

TABLE 1

CNN architectural configuration used for BCNN, SSR-CNN and SRCNN. Every convolutional layer is followed by a leaky ReLU [23] with 10% leakage value.

| Dataset | MNIST Or CIFAR-10/100 | Caltech-101 Or ImageNet-2012 |
|---|---|---|
| Architectures | BCNN/TCNN/SRCNN | BCNN/TCNN/SRCNN |
| Input Size | 28 × 28 × 1 Or 32 × 32 × 3 | 224 × 224 × 3 |
| SubBand | —/1-Layer/1-Layer | —/1-Layer/1-Layer |
| CONV + ReLu | 3 × 3 × 1 × 64/3 × 3 × 4 × 64/ 3 × 3 × 1 × 16 × 4 | 3 × 3 × 3 × 64/3 × 3 × 12 × 64/ 3 × 3 × 3 × 16 × 4 |
| CONV + ReLu | 3 × 3 × 64 × 128/3 × 3 × 64 × 128/ 3 × 3 × 16 × 32 × 4 | 3 × 3 × 64 × 64/3 × 3 × 64 × 64/ 3 × 3 × 16 × 16 × 4 |
| CONV + ReLu | 3 × 3 × 128 × 256/3 × 3 × 128 × 256/ 3 × 3 × 32 × 64 × 4 | 3 × 3 × 64 × 64/3 × 3 × 64 × 64/ 3 × 3 × 16 × 16 × 4 |
| CONV + ReLu | — | 3 × 3 × 64 × 64/3 × 3 × 64 × 64/ 3 × 3 × 16 × 16 × 4 |
| CONV + ReLu | — | 3 × 3 × 64 × 64/3 × 3 × 64 × 64/ 3 × 3 × 16 × 16 × 4 |
| POOL | 2-by-2 | 2-by-2 |
| CONV + ReLu | 3 × 3 × 256 × 512/3 × 3 × 256 × 512/ 3 × 3 × 64 × 128 × 4 | 3 × 3 × 64 × 128/3 × 3 × 64 × 128/ 3 × 3 × 16 × 32 × 4 |
| CONV + ReLu | 3 × 3 × 512 × 128/3 × 3 × 512 × 128/ 3 × 3 × 128 × 32 × 4 | 3 × 3 × 64 × 128/3 × 3 × 64 × 128/ 3 × 3 × 16 × 32 × 4 |
| CONV + ReLu | — | 3 × 3 × 64 × 128/3 × 3 × 64 × 128/ 3 × 3 × 16 × 128 × 4 |
| CONV + ReLu | — | 3 × 3 × 64 × 128/3 × 3 × 64 × 128/ 3 × 3 × 16 × 32 × 4 |
| CONV + ReLu | — | 3 × 3 × 64 × 128/3 × 3 × 64 × 128/ 3 × 3 × 16 × 32 × 4 |
| POOL | 2-by-2 | 2-by-2 |

TABLE 1-continued

CNN architectural configuration used for BCNN, SSR-CNN and SRCNN. Every convolutional layer is followed by a leaky ReLU [23] with 10% leakage value.

| Dataset | MNIST Or CIFAR-10/100 | Caltech-101 Or ImageNet-2012 |
|---|---|---|
| CONV + ReLu | — | 3 × 3 × 64 × 128/3 × 64 × 128/ |
|  |  | 3 × 3 × 16 × 32 × 4 |
| CONV + ReLu | — | 3 × 3 × 128 × 128 |
| CONV + ReLu | — | 3 × 3 × 128 × 128 |
| CONV + ReLu | — | 3 × 3 × 128 × 128 |
| CONV + ReLu | — | 3 × 3 × 128 × 128 |
| POOL | — | 2-by-2 |
| FC-1 | 4 × 4 × 128 × 4096 | 4 × 4 × 128 × 4096 |
| DROPOUT [2] | 50% | 50% |
| FC-2 | 4096 × 1024 | 4096 × 1024(C. Tech) Or 4096 × 4096(Im. Net) |
| DROPOUT [2] | 50% | 50% |
| FC-3 | 1024 × 10/1024 × 100 | 4096 × 102/4096 × 1000 |
| SOFTMAX | 1 × 10/1 × 100 | 1 × 102/1 × 1000 |

The input image is first decomposed into K sub-bands as described by Equation 1. The sub-bands are then individually passed through their corresponding CNNs. Finally, the fully connected (FC) layers combine the feature outputs of the sub-band CNNs and perform image classification. The output of the CNN at the kth sub-band and ith layer is given by:

$$X_{i+1}^k = \text{Pool}(\text{ReLU}(\text{Conv}(X_i^k, W_i^k), L_i^k), P_i^k) \quad (2)$$

where Conv represents the convolution between the input $X_i^k$ of the ith layer and the weights $W_i^k$. ReLU(.) indicates the ReLU activation function with $L_i^k$ representing the leakage percentage value which is a real number between 0 and 1. Pool(.) represents the pooling function with pooling parameters $P_i^k$. The outputs of the sub-band CNNs are accumulated to yield $X^{FC}_0$ which is the input to the first FC layer:

$$X^{\{FC_0\}} = (X_I^1, \ldots, X_I^K) \quad (3)$$

where I is the number of layers in the sub-band CNNs. The output at each FC layer is given by:

The proposed architecture emphasizes regularization through its structure, thus it is structurally regularized. To enhance regularization effectiveness, the decomposed sub-bands can be critically sampled and band-limited before being processed by individual sub-band CNNs. For example, in one aspect, the input image can be a full band signal. Upon decomposition into four different frequency bands (e.g., LL, LH, HL and HH), each of the sub-band images now have half the frequency band in each of the x and y dimensions, hence they can be decimated by 2 along x and y dimensions to maintain critical sampling. This results in band-limited sub-band images of LL, LH, HL and HH.

Each of the sub-band CNNs can be inhibited from accessing information across the entire spectrum of the input. In one aspect, overall, each of the CNNs cannot learn sample-specific features present in the entire spectrum of the input. This restriction combined with weight regularization within each CNN, improves regularization, leading to better generalization ability and reduced overfitting, as demonstrated by the accuracy performance comparison shown in Table 2.

TABLE 2

Comparison of total MAC operations, parameters used and classification accuracy of 1&2-layer DWT SRCNN architecture with other well established CNN models for the ImageNet-2012 dataset.

| Models | MACs | Param. (Million) | Param. (MByte) | Accuracy (Top-1) | Accuracy (Top-5) | Delta Top (5-1) |
|---|---|---|---|---|---|---|
| MobileNet V1 | 569 M | 4.24 | 2 | 70.9 | 89.9 | 19 |
| MobileNet V2 | 300 M | 3.47 | 1.7 | 71.8 | 9.1 | 19.2 |
| Google Net | 741 M | 6.99 | 3.3 | — | 92.1 | — |
| AlexNet | 724 M | 60.95 | 29.1 | 62.5 | 83 | 20.5 |
| SqueezeNet | 451 M | 1.24 | 0.6 | 57.5 | 80.3 | 22.8 |
| ResNet-50 | 3.9 B | 25.6 | 12.2 | 75.2 | 93 | 17.8 |
| VGG | 15.5 B | 138 | 65.8 | 70.5 | 91.2 | 20.7 |
| Inception-V1 | 1.43 B | 7 | 3.3 | 69.8 | 89.3 | 19.5 |
| SRCNN (1L) | 169.5 M | 42.05 | 20.1 | 65.6 | 82.17 | 16.57 |
| SRCNN (2L) | 46.34 M | 13.64 | 6.5 | — | — | — |

$$X^{FC_{n+1}} = \text{ReLU}(W^{FC_n} \cdot X^{FC_n}, L^{FC_n}) \quad (4)$$

where $X^{FC}_n$ denotes the output of the nth FC layer, "." indicates matrix multiplication and $L^{FC}_n$ indicates the ReLU leakage value. Finally, the output of the last FC layer $X^{FC}_N$, indexed by N, produces the machine learning architecture 100 output Y. In one aspect, Equations 1 to 4 can be used to describe the complete input to output relation of the proposed sub-band based CNN.

Apart from accuracy, the difference in Top-5 and Top-1 accuracy result can be considered as an indicator for generalization effectiveness. A lower difference value indicates better generalization which, in our case, outperforms other state-of-the-art networks. For example, the Delta or difference value of 16.27 for the SRCNN with 1 fully connected layer shown in the last column is the lowest among the comparison CNN models.

The lossless decomposition of the input spectrum into orthogonal sub-bands allows isolated analysis of the spatial representation of each sub-band. This is beneficial in the case of corrupted images. Indeed, corruption of the input image by noise, deformities from lens aberration, incorrect exposure, low lighting, etc., does not affect the entire spectrum equally; in reality, some sub-bands are corrupted more. Isolating the sub-bands ensures that the corruption of extracted features is limited to the affected sub-bands, as opposed to a full-band CNN that considers the entire spectrum for feature extraction.

Along similar lines, quantization noise in each weight is confined within the sub-band and does not affect the entire spectrum. In contrast, in a regular CNN, quantization noise in any weight can potentially corrupt the entire spectrum, since quantization noise can have a large bandwidth. Results indicate that compared to a full-band CNN, the SRCNN proves more robust to weight and input quantization.

The sub-band decomposition can also introduce a high degree of sparsity in the sub-bands, specifically in the non-basebands containing mostly edge information. This sparsity is introduced at the very input of the sub-band CNNs. Sparse inputs can help to reduce CNN complexity.

Random initialization of weights when training a full-band CNN does not guarantee scanning of the entire spectrum for useful features. In the proposed structure, the CNNs can focus only on their corresponding sub-bands, and thus the entire spectral decomposed into sub-bands can be covered equally.

The decomposition reduces the input spatial dimension along rows and columns by $2^M$ each, where M is the number of decomposition layers. The total reduction of input dimension is effectively on the order of $4^M$ for two-dimensional input data, such as images. The convolution operation accounts for the bulk of computations in a CNN. The total computation cost depends super-linearly on the size of the convolution filters and the sample point counts per dimension, all of which are significantly reduced for the machine learning architectures presented herein.

The sub-band decomposition architecture offers parallel computation along each sub-band. This parallelism may provide a mechanism to reduce internal memory footprint by sequentially computing each sub-band and reusing internal scratch memory to compute each sub-band CNN. Finally, decomposition of input spectra into sub-bands is a generalized technique and can be applied to any CNN to improve regularization, and thereby improve generalization capacity and overall performance.

The analysis of an image and the sub-bands of the image can be a powerful tool in signal processing. It can be been used in numerous application such as source coding, image compression, and other applications. Real life images typically have a lot of sharp edges, sharp curves, sharp color contrast between the background and foreground areas. At the same time, they may have very smooth gradients. These are the perfect attributes that can benefit sub-band analysis where each sub-band provides relatively uncorrelated analysis of data compared to the ample spacial correlation existing in the full spectrum image. For analysis, this disclosure presents three different examples of sub-band decomposition architectures.

Returning now to FIG. 2, which is the block diagram illustrating the example sub-band decomposition architecture 200 including the wavelet transform 204 in accordance with some aspects of the disclosure. The sub-band decomposition architecture (e.g., wavelet transform system/structure or WTS) 200 is a generalized M-layer sub-band decomposition structure with fixed filter weights used in the wavelet transform 204. The sub-band decomposition architecture 200 further includes an input image 202. Wavelets are defined by the wavelet mother function and scaling function in the time domain. The wavelet function is in effect a band-pass filter and scaling it for each level divides the bandwidth in half. The wavelet basis functions are localized in time and frequency, properties that make wavelets an ideal tool for representing signals or their derivatives containing discontinuities or signals that are non-stationary. The wavelet basis functions are capable of deconstructing complex images into basis signals of finite bandwidth. In one aspect, there may be little or no signal leakage or phase-shifting of the original signal during decomposition. As such, the information of the original signal can be retained. Consequently, the wavelet basis functions can be used to perfectly decompose and reconstruct arbitrary images with linear or higher order polynomial shapes, such as rectangles, triangles, $2^{nd}$ order polynomials, and the like. This is something that Fourier basis functions fail to do. The decomposition offers a few interesting characteristics, such as criticality sampled sub-bands, orthogonal sub-bands and also offers computational advantages during training as the weights are fixed.

Figure 3:
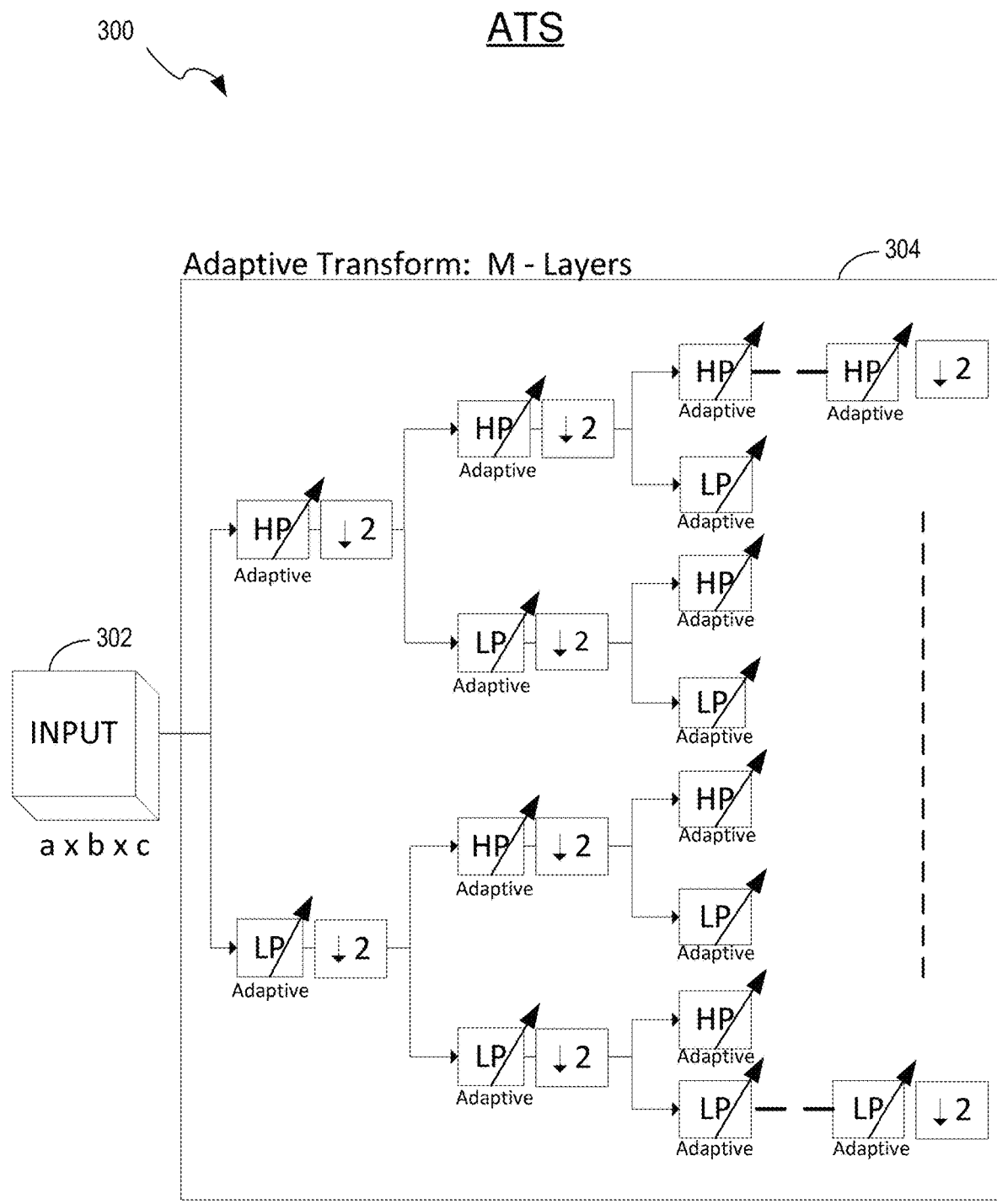
FIG. 3 is a block diagram illustrating an example sub-band decomposition architecture including an adaptive transform in accordance with some aspects of the disclosure.
Figure 4:
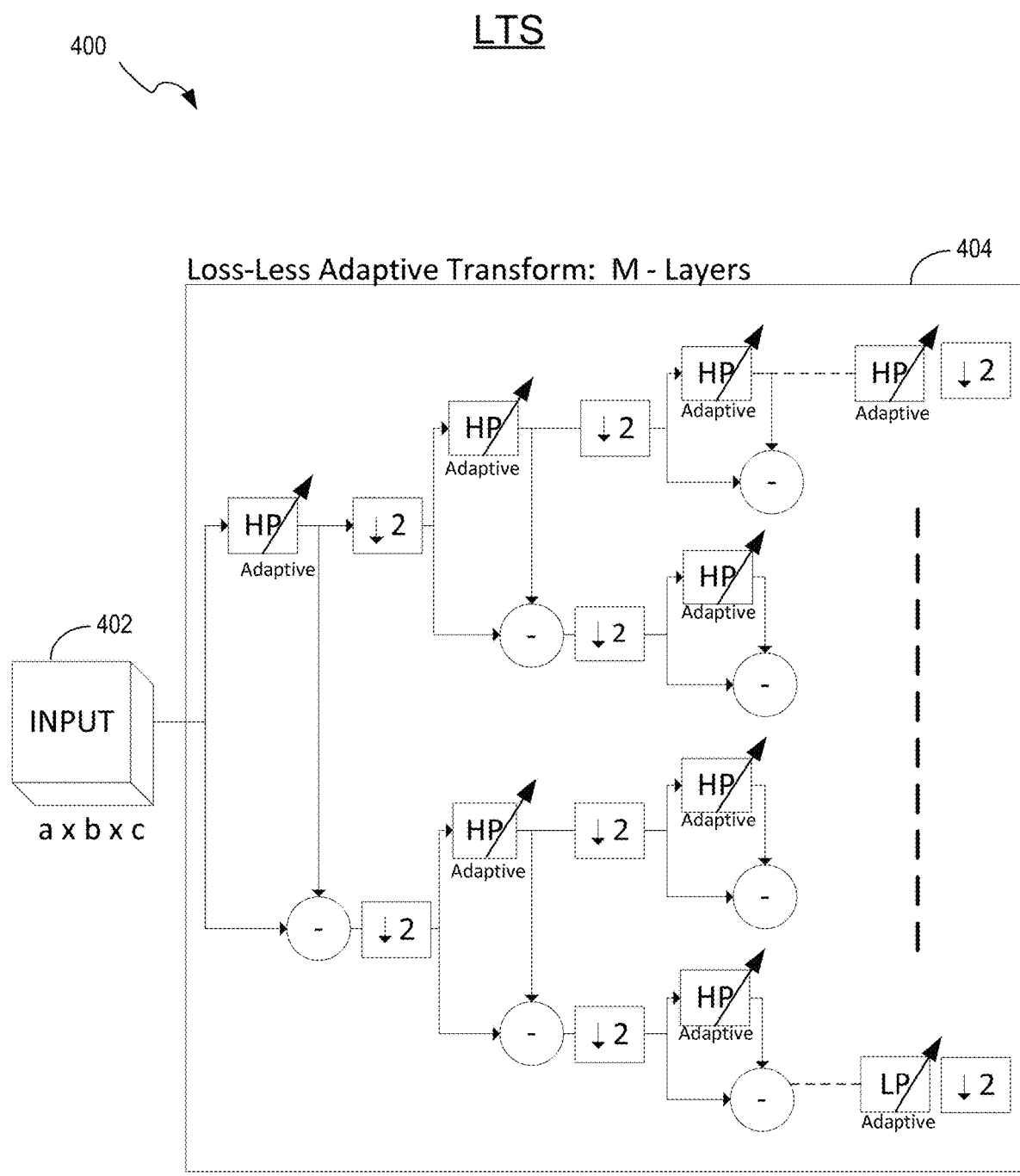
FIG. 4 is a block diagram illustrating an example sub-band decomposition architecture including a loss-less adaptive transform in accordance with some aspects of the disclosure.

The wavelet transform 204 includes M layers where each layer includes $2^M$ filters where every layer includes an equal number of high pass and low pass filters. For example, the first layer has $2^1$ filters including one high pass filter (HP) and one low pass filter (LP) directly coupled to the input 202. For the wavelet transform 204, the high pass and low pass filters can be set to fixed frequencies such that they are not adjustable. In one aspect, the wavelet transform 204 can divide the input image into equally divided sub-bands or into unequally divided sub-bands. In one aspect, the wavelet transform 204 includes $2^M$ filters along each X and Y directions. For example, 1 layer decomposition can result in 4 sub-bands, 2 layer decomposition can result in 16 sub-bands, and 3 layer decomposition can result in 64 sub-bands. FIGS. 2, 3 and 4 indicate the filters in one of the dimensions along X or Y and is for illustration only.

In one aspect, wavelet transform 204 can be used in the machine learning architecture 100 of FIG. 1 to perform the functions of the sub-band decomposition block, or in other machine learning architectures described herein for sub-band decomposition.

FIG. 3 is a block diagram illustrating an example sub-band decomposition architecture 300 including an adaptive transform 304 in accordance with some aspects of the disclosure. The sub-band decomposition architecture 300 further includes an input image 302. The adaptive transform based decomposition 304 (ATS) includes M layers where each layer includes $2^M$ filters where every layer includes an equal number of adaptive high pass and low pass filters. For example, the first layer has $2^1$ filters including one adaptive high pass filter (HP) and one adaptive low pass filter (LP) directly coupled to the input 302, along each X and Y dimension (e.g., for a total of 4 filters). For the adaptive transform 304, the high pass and low pass filters are adjustable, and can be trained based on back-propagation. The error derivatives can be propagated from each of the CNNs attached to each of the sub-bands and propagated all the way to the input 302. This error derivatives can be used to update the weights in the adaptive filters at each stage of the adaptive transform in 304. In one aspect, the adaptive transform 304 can divide the input image into equally divided sub-bands. In one aspect, the adaptive transform 304 can divide the input image into unequally divided sub-bands.

Sub-band decomposition architecture 300 is a generalized M-Layer sub-band decomposition structure. A layer of sub-band decomposition may include filtering and decimation-by-2 along an x-dimension followed by filtering and decimation-by-2 along a y-dimension. Hence, at the output of each layer, each input sub-band is split into four sub-bands with half the resolution along each x and y dimension. Hence, the sub-band structure can be limited to producing multiples of 4 generated sub-bands. During training, the error gradient can be back-propagated all the way up to the sub-band structures. It is these error derivatives that can train the weights of the filters making it an end-to-end trained system. Another point to be noted is that the net dimension of the input and the final stack of generated sub-bands can be the same. Since the filters can be initialized randomly and trained for the entire dataset without any constraints specific to the sub-bands, the information content at the input and at the sub-bands may or may not be the same and is driven by the error derivatives generated during training.

In one aspect, adaptive transform 304 can be used in the machine learning architecture 100 of FIG. 1 to perform the functions of the sub-band decomposition block, or in other machine learning architectures described herein for sub-band decomposition.

FIG. 4 is a block diagram illustrating an example sub-band decomposition architecture 400 including a loss-less adaptive transform 404 (LTS) in accordance with some aspects of the disclosure. The sub-band decomposition architecture 400 further includes an input image 402. The sub-band decomposition architecture 400 is a generalized M-Layer spectral complementary sub-band decomposition structure. The LTS structure 404 is very similar to ATS 304 in terms of sub-band decomposition and training during back propagation. The main difference is apparent in the filtering and decimation-by-2 structures. Instead of using an unconstrained structure like ATS, LTS 404 imposes a constraint. While splitting each sub-band into high and low along each dimension, LTS 404 imposes the concept of a complementary spectral split. This allows the LTS 404 to preserve the net information content while decomposing into the sub-bands. Another point of difference is that the LTS structure 404 may use only half the number of filters to be trained as compared to the ATS structure 304. The spectral complementary structure also results in modified computations for the error derivatives.

Figure 5:
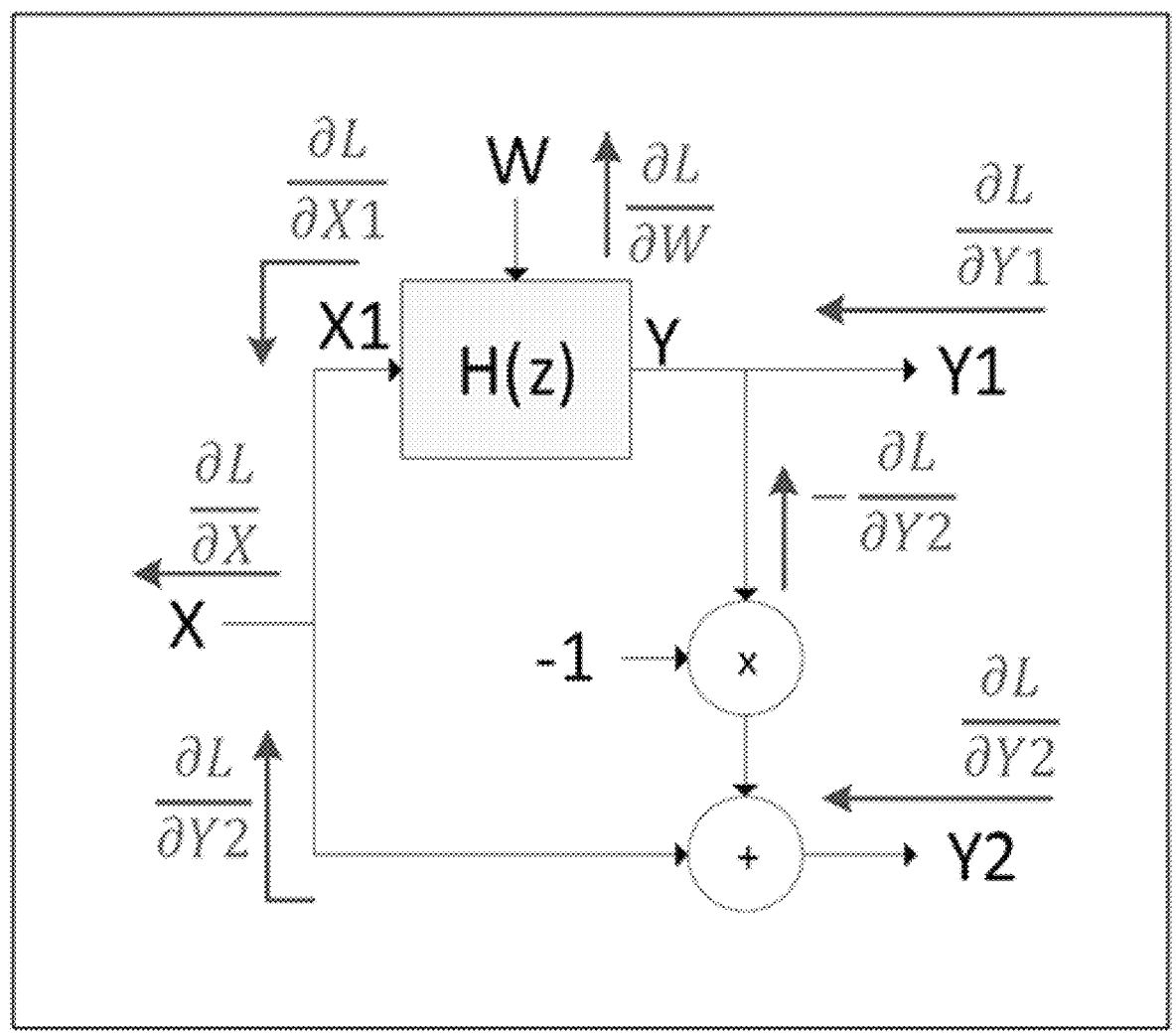
FIG. 5 is a diagram illustrating an example of error derivative flow for a sub-band decomposition architecture in accordance with some aspects of the disclosure.

FIG. 5 is a diagram illustrating an example of error derivative flow 500 for a sub-band decomposition architecture in accordance with some aspects of the disclosure. Referring to FIG. 5, let L be the loss function, $$\frac{\partial L}{\partial Y1}$$

be the back-propagating error derivative with respect to output Y1, $$\frac{\partial L}{\partial Y1}$$

the error derivative with respect to output Y2, $$\frac{\partial L}{\partial W}$$

to error derivative with respect to weights W, $$\frac{\partial L}{\partial X}$$

the error derivative with respect to the input X or the gradient passing down to the downstream module and $$\frac{\partial Y}{\partial X}$$

is the local gradient of function H(z). Then, the resulting equations could be:

$$\frac{\partial L}{\partial Y} = \frac{\partial L}{\partial Y1} - \frac{\partial L}{\partial Y2}$$

$$\frac{\partial L}{\partial X} = \frac{\partial L}{\partial Y} \cdot \frac{\partial Y}{\partial X} + \frac{\partial L}{\partial Y2}$$
$$= \frac{\partial L}{\partial Y1} \cdot \frac{\partial Y}{\partial X} - \frac{\partial L}{\partial Y2} \frac{\partial Y}{\partial X} + \frac{\partial L}{\partial Y2}$$
$$= \frac{\partial Y}{\partial X}\left(\frac{\partial L}{\partial Y1} - \frac{\partial L}{\partial Y2}\right) + \frac{\partial L}{\partial Y2}$$

$$\frac{\partial L}{\partial W} = \frac{\partial L}{\partial Y} \frac{\partial Y}{\partial W}$$
$$= \frac{\partial L}{\partial Y1} \cdot \frac{\partial Y1}{\partial W} - \frac{\partial L}{\partial Y2} \frac{\partial Y}{\partial W}$$
$$= \frac{\partial Y}{\partial X}\left(\frac{\partial L}{\partial Y1} - \frac{\partial L}{\partial Y2}\right)$$

In one aspect, computing $$\frac{\partial L}{\partial X}$$

can be important to propagate the error derivative to the next module, while $$\frac{\partial L}{\partial W}$$

can be required to update the filter weights.

In one aspect, loss-less adaptive transform 404 can be used in the machine learning architecture 100 of FIG. 1 to perform the functions of the sub-band decomposition block, or in other machine learning architectures described herein for sub-band decomposition.

Figure 6:
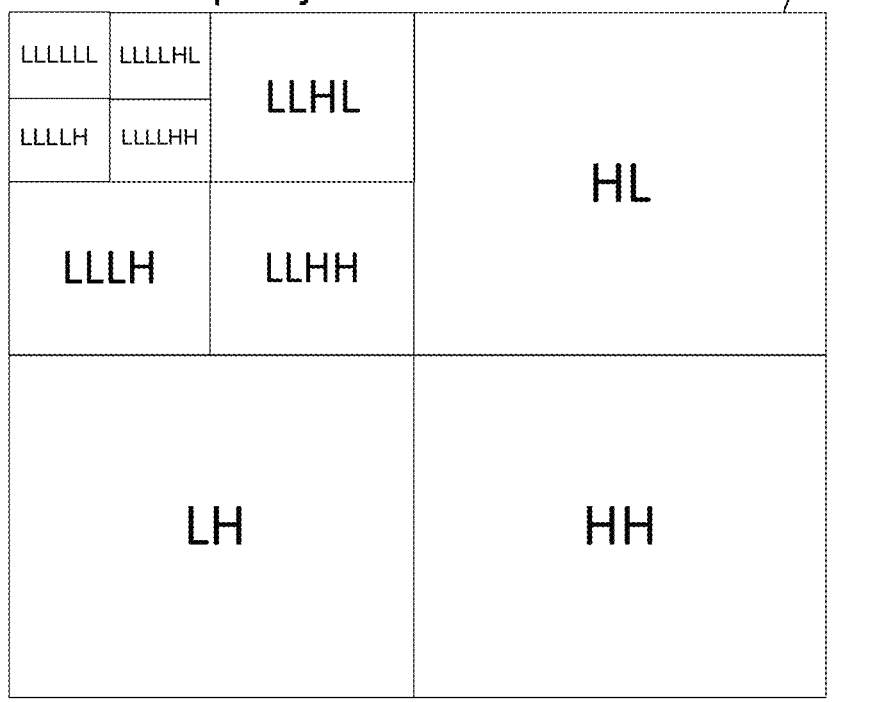
FIG. 6 is a diagram illustrating example techniques for decomposing/dividing sub-bands in accordance with some aspects of the disclosure.

FIG. 6 is a diagram illustrating example techniques for decomposing/dividing sub-bands in accordance with some aspects of the disclosure. FIG. 6 illustrates one technique for unequally dividing sub-bands in a first table 600. FIG. 6 illustrates another technique for equally dividing sub-bands in a second table 602. In one aspect, any of the transforms described herein for decomposing an input image can decomposing the input image into multiple sub-bands either equally or unequally, depending on the intended application.

Second Example Machine Learning Architecture

Figure 7:
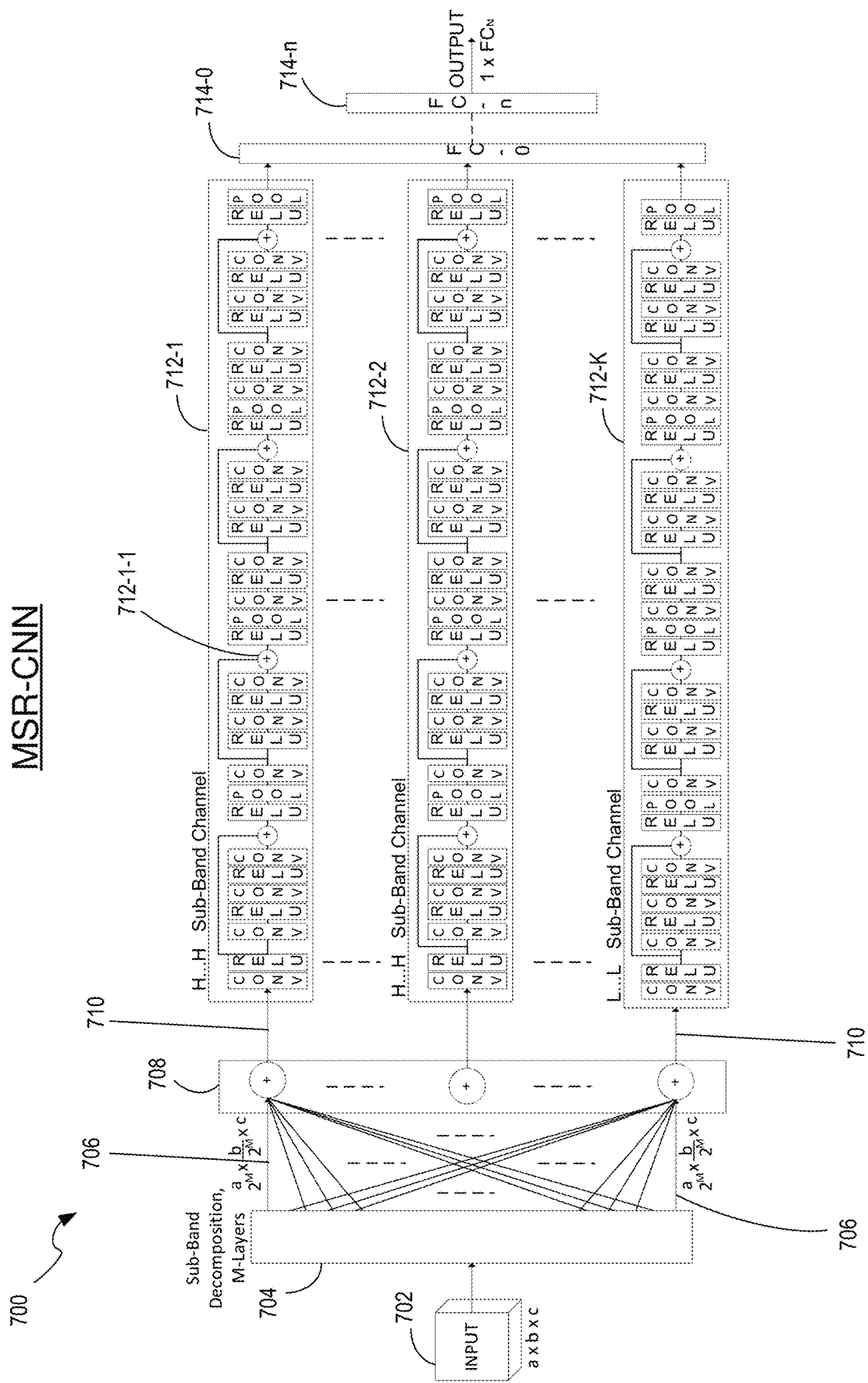
FIG. 7 is a block diagram illustrating an example machine learning architecture including sub-band decomposition, a mixing structure, and CNNs in accordance with some aspects of the disclosure.

FIG. 7 is a block diagram illustrating an example machine learning architecture 700 including sub-band decomposition 704, a mixing structure 708, and CNNs 712-x in accordance with some aspects of the disclosure. The machine learning architecture 700 can also be thought of as a generalized L-level multi-channel sub-band regularized CNN (MSR-CNN) architecture, parametrized by input dimensions a×b× c, the number of sub-bands K, the convolutional layers per sub-band I, the FC layers N and output classes $FC_N$, all open to optimization. The MSR-CNN architecture 700 can be based on processing each of the sub-bands separately by individual CNNs. The field of view of each CNN can be restricted to a dedicated sub-band, making each CNN indifferent to the rest of the sub-bands.

At the sub-band decomposition block 704, the sub-bands can be decomposed using any of the three sub-band decomposition techniques described earlier (ATS 304, LTS 404, or WTS 204). The decomposition can be achieved by filtering and decimating along both row and column one after the other. In the case of ATS 304 and LTS 404, the filter coefficients before decimation can be learned during training through back propagation. In the case of WTS 204, the filter coefficients can be fixed using wavelet transform. The error derivatives can be propagated from each of the sub-band CNNs, and their derivatives can be passed on to the sub-band decomposition structure 704, all the way to the input. The CNN structure processing for each sub-band was selected to be similar to both Alexnet and VGG16, with the difference of having residual layer connections before every pooling layer, as seen in FIG. 7 and detailed architectural design parameters used for experimentation are given in Table 3.

TABLE 3

CNN configuration used for BCNN, SSR-CNN and MSR-CNN. Every convolution layer is followed by a leaky ReLU [45] with 10% leakage. The architecture was optimized using 10% of training data as validation set.

| Data-Set | MNIST OR CIFAR-10/100 | | |
|---|---|---|---|
| Architecture | BCNN | SSR-CNN | MSR-CNN |
| Input size | 28 × 28 × 1 | 28 × 28 × 1 | 28 × 28 × 1 |
| DWT | — | 1-Layer | 1-Layer |
| CONV | 3 × 3 × 1 × 64 | 3 × 3 × 4 × 64 | 3 × 3 × 1 × (64/4) × 4 |
| CONV | 3 × 3 × 64 × 128 | 3 × 3 × 64 × 128 | 3 × 3 × (64/4) × (128/4) × 4 |
| CONV | 3 × 3 × 128 × 256 | 3 × 3 × 128 × 256 | 3 × 3 × (128/4) × (256/4) × 4 |
| CONV | — | — | — |
| CONV | — | — | — |
| POOL | 2-by-2 | 2-by-2 | 2-by-2 |
| CONV | 3 × 3 × 256 × 512 | 3 × 3 × 256 × 512 | 3 × 3 × (256/4) × (512/4) × 4 |
| CONV | 3 × 3 × 512 × 128 | 3 × 3 × 512 × 128 | 3 × 3 × (512/4) × (128/4) × 4 |
| CONV | — | — | — |
| CONV | — | — | — |
| CONV | — | — | — |
| POOL | 2-by-2 | — | N/A |
| CONV | — | — | — |
| CONV | — | — | — |
| CONV | — | — | — |
| CONV | — | — | — |
| CONV | — | — | — |
| POOL | — | — | — |
| FC-1 | 7 × 7 × 128 × 4096 | 7 × 7 × 128 × 4096 | 7 × 7 × 128 × 4096 |
| DROPOUT | 50% | 50% | 50% |
| FC-2 | 4096 × 1024 | 4096 × 1024 | 4096 × 1024 |
| DROPOUT | 50% | 50% | 50% |
| FC-3 | 1024 × 10 OR 1024 × 101 | 1024 × 10 OR 1024 × 101 | 1024 × 10 OR 1024 × 101 |
| SOFTMAX | 1 × 10 OR 1 × 101 | 1 × 10 OR 1 × 101 | 1 × 10 OR 1 × 101 |

| Data-Set | Caltech-101 OR ImageNet-2012 | | |
|---|---|---|---|
| Architecture | BCNN | SSR-CNN | MSR-CNN |
| Input size | 224 × 224 × 3 | 224 × 224 × 3 | 224 × 224 × 3 |
| DWT | — | 1-Layer | 1-Layer |
| CONV | 3 × 3 × 3 × 64 | 3 × 3 × 12 × 64 | 3 × 3 × 3 × (64/4) × 4 |
| CONV | 3 × 3 × 64 × 64 | 3 × 3 × 64 × 64 | 3 × 3 × (64/4) × (64/4) × 4 |
| CONV | 3 × 3 × 64 × 64 | 3 × 3 × 64 × 64 | 3 × 3 × (64/4) × (64/4) × 4 |
| CONV | 3 × 3 × 64 × 64 | 3 × 3 × 64 × 64 | 3 × 3 × (64/4) × (64/4) × 4 |
| CONV | 3 × 3 × 64 × 64 | 3 × 3 × 64 × 64 | 3 × 3 × (64/4) × (64/4) × 4 |
| POOL | 2-by-2 | 2-by-2 | 2-by-2 |
| CONV | 3 × 3 × 64 × 128 | 3 × 3 × 64 × 128 | 3 × 3 × (64/4) × (128/4) × 4 |
| CONV | 3 × 3 × 128 × 128 | 3 × 3 × 128 × 128 | 3 × 3 × (128/4) × (128/4) × 4 |
| CONV | 3 × 2 × 128 × 128 | 3 × 3 × 128 × 128 | 3 × 3 × (128/4) × (128/4) × 4 |
| CONV | 3 × 3 × 128 × 128 | 3 × 3 × 128 × 128 | 3 × 3 × (128/4) × (128/4) × 4 |
| CONV | 3 × 3 × 128 × 128 | 3 × 3 × 128 × 128 | 3 × 3 × (128/4) × (128/4) × 4 |
| POOL | 2-by-2 | 2-by-2 | 2-by-2 |
| CONV | 3 × 3 × 64 × 128 | 3 × 3 × 64 × 128 | 3 × 3 × (64/4) × (128/4) × 4 |
| CONV | 3 × 3 × 128 × 128 | 3 × 3 × 128 × 128 | 3 × 3 × (128/4) × (128/4) × 4 |
| CONV | 3 × 3 × 128 × 128 | 3 × 3 × 128 × 128 | 3 × 3 × (128/4) × (128/4) × 4 |

TABLE 3-continued

CNN configuration used for BCNN, SSR-CNN and MSR-CNN. Every convolution layer is followed by a leaky ReLU [45] with 10% leakage. The architecture was optimized using 10% of training data as validation set.

| | | | |
|---|---|---|---|
| CONV | 3 × 3 × 128 × 128 | 3 × 3 × 128 × 128 | 3 × 3 × (128/4) × (128/4) × 4 |
| CONV | 3 × 3 × 128 × 128 | 3 × 3 × 128 × 128 | 3 × 3 × (128/4) × (128/4) × 4 |
| POOL | 2-by-2 | 2-by-2 | 2-by-2 |
| FC-1 | 4 × 4 × 128 × 4096 OR 28 × 28 × 128 × 4096 | 4 × 4 × 128 × 4096 OR 14 × 14 × 128 × 4096 | 4 × 4 × 128 × 4096 OR 14 × 14 × 128 × 4096 |
| DROPOUT | 50% | 50% | 50% |
| FC-2 | 4096 × 4096 | 4096 × 1024 | 4096 × 1024 |
| DROPOUT | 50% | 50% | 50% |
| FC-3 | 4096 × 101 OR 4096 × 1000 | 4096 × 101 OR 4096 × 1000 | 4096 × 101 OR 4096 × 1000 |
| SOFTMAX | 1 × 101 OR 1 × 1000 | 1 × 101 OR 1 × 1000 | 1 × 101 OR 1 × 1000 |

The sub-band decomposition structure/block 704 decomposes the input (e.g., data such as an image or input image spectra) 702 into sub-bands 706. Then, a mixing structure 708 is used to mix information among the sub-bands 706 to generate mixed sub-bands 710 before each mixed sub-band 710 is processed by the sub-band channel CNNs (712-1, 712-2, ..., 712-K). The idea behind this is that when using ATS decomposition 304, it may not be possible to guarantee that equal information gets split into the decomposed/divided sub-bands, which results from random initialization of the sub-band decomposition filter weights. The mixing structure 706 helps adapt to the potential unequal separation of information, reducing the possibility of any single sub-band with shallow information. The mixing structure/layer 706 combines a weighted sum of the sub-bands 706 to form mixed sub-bands 710, and these weights are learned at training through back-propagation. A lower learning rate for the sub-band filters than the sub-band CNNs is maintained to keep the update of the CNN structure more stable. This disclosure later demonstrates that when using the ATS and LTS sub-band decomposition methods, the sub-band structure learns filters that are of known types, such as: bandpass, band-stop, low-pass and high-pass structures which are typically used in signal processing. The complete decomposition of an image $X_{in}$ into K sub-bands can be represented by:

$$(X_0^1, \ldots, X_0^K) = SDF(X_{in}, K, M) \quad (5)$$

where SDF is the sub-band decomposition filter function, M is the number of SDF layers, K sub-bands and $X_0^k$ (k=1, ..., K) are the SDF coefficients of the kth sub-band. FIG. 2 shows a generalized L-level wavelet decomposition. The filtering and decimation are performed one after the other, repeated for every dimension. This is due to the separability property of the wavelet basis functions along each dimension. In this embodiment, the Daubechies family of basis-functions was selected for the SDF, which can be used for image sub-band decomposition in image compression. Specifically, the Daubechies D2 (also referred to as the 'db1', or Haar) orthogonal wavelet basis functions are selected. These constitute the simplest Daubechies wavelet basis, with a single vanishing moment. By being symmetrical, they offer linear phase characteristics, which can result in perfect signal reconstruction. They also may not suffer from the edge effect characteristics of higher order wavelets. These properties can make the Daubechies D2 the ideal choice, in some applications, for finding the location of the edges, which is beneficial to image classification. In one aspect, it is noted that higher order Daubechies wavelets such as 'db2' all the way to 'db6' appear to perform as good as 'db1' wavelets within the framework of CNNs presented herein, where features are learned from the input data.

The input image 702 is first decomposed into K mixed sub-bands 710 as described by Equation 5. As shown in FIG. 7, the mixed sub-bands 710 are then individually passed through their corresponding sub-band channel CNNs 712-X. Finally, the FC layers (714-0, 714-1, 714-2) combine the feature outputs of the sub-band CNNs and perform image classification. The output of a given CNN at the kth sub-band and ith layer is given by:

$$X_{i+1}^k = \text{Pool}(\text{ReLU}(\text{Conv}(X_i^k, W_i^k), L_i^k), P_i^k) \quad \text{(2 repeated)}$$

where 'Conv' represents convolution between the input $X_i^k$ of the ith layer and weights $W_i^k$. 'ReLU' indicates the ReLU activation function with $L_i^k$ representing the ReLU leakage percentage value which can be a real number between 0 and 1. 'Pool' represents the pooling function with pooling parameters $P_i^k$. The outputs of the sub-band CNNs are accumulated together yielding $X^{FC}_0$ which is the input to the first FC layer:

$$X^{\{FC0\}} = (X_I^1, \ldots, X_I^K) \quad \text{(3 repeated)}$$

where I is the number of layers in the sub-band CNNs. The output at each FC layer is given by:

$$X^{FCn+1} = \text{ReLU}(W^{FCn} \cdot X^{FCn}, L^{FCn}) \quad \text{(4 repeated)}$$

where $X^{FCn}$ denotes the output of the nth FC layer, '.' indicates matrix multiplication operation and $L^{FCn}$ indicates ReLU leakage value. Finally, the output, Y, is given by:

$$Y = X^{FC_N} \quad (6)$$

where $X^{FC_N}$ denotes the last FC layer, indexed by N. In one aspect, Equations 2, 3, 4, and 6 can describe the complete input to output relation of the proposed sub-band based CNN network of FIG. 7.

In one aspect, a process for operating the machine learning architecture 700 could include a number of actions. In a first action, the sub-band decomposition block 704 could receive data (e.g., input image 702) including a pattern to be recognized. In a second action, the sub-band decomposition block 704 could decompose the data 702 into a plurality of sub-bands 706. Next, the mixing block 708 could mix the plurality of sub-bands 706 to form a plurality of mixed sub-bands 710. Next, the CNN channel blocks 712-X could process each of the plurality of mixed sub-bands 710 with a respective convolutional neural network (CNN) 712, where each of the CNNs operates independently of the other CNNs. Next, the fully connected layers 714-X could aggregate output of the CNNs. Next, feedback circuitry or CNN back propagation circuitry could be used to train, using the aggregated output, the CNNs 712-X to recognize the pattern.

In one aspect, at least one of the plurality of mixed sub-bands 710 includes information (e.g., data derived from the input image 702) from two or more of the plurality of sub-bands 706.

The CNN channel blocks 712-X each include one CNN having a particular structure as shown in FIG. 7. In one aspect, a different CNN structure, including any CNN, could be used for any of the sub-bands. The CNN channel blocks 712-X each include one CNN having one or more skip connects or residual connections 712-1-1.

Third Example Machine Learning Architecture

Figure 8:
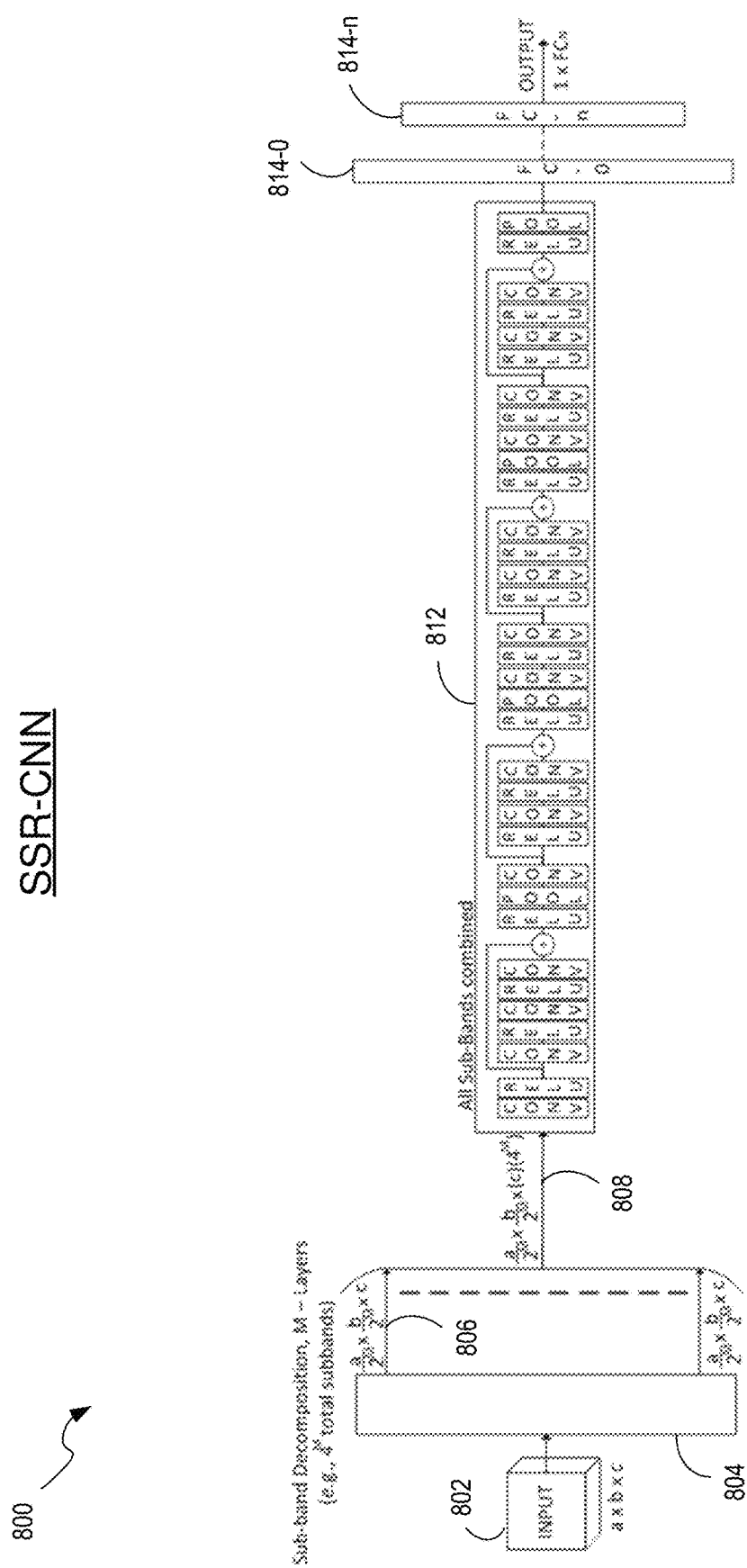
FIG. 8 is a block diagram illustrating an example machine learning architecture including sub-band decomposition and a single CNN in accordance with some aspects of the disclosure.

FIG. 8 is a block diagram illustrating an example machine learning architecture 800 including sub-band decomposition 804 and a single CNN 812 in accordance with some aspects of the disclosure. The machine learning architecture 800 is a generalized structure of a single channel sub-band regularized CNN (SSR-CNN), parametrized by input dimensions a×b×c, the number of sub-bands K, the convolutional layers per sub-band I, the FC layers N and output classes $FC_N$. The input image 802 is first decomposed into sub-bands (e.g., K equal to $4^M$ number of sub-bands) 806 and then the sub-bands are stacked together and treated as a single input with multiple channels (e.g., $4^M$ number of sub-bands, each having a dimension of $$\frac{a}{2^M} \times \frac{b}{2^M} \times c)$$

808 before being processed by a single CNN 812 to extract features from the sub-bands combined, followed by fully connected layers (814-0, 814-n) to classify. The SSR-CNN architecture 800 can use the same front end sub-band decomposition structures as are described above, like the MSR-CNN 700 (e.g., ATS 304, LTS 404 and WTS 204) decomposition structures. In one aspect, the sub-band decomposition block 804 divides the image 802 into K sub-bands of equal size. In one aspect, one or more of the sub-bands (e.g., 806 or 808) may not be used, and in such case, may be removed.

In one example, where the sub-band decomposition block 804 (e.g., with an input of 3 channels) contains a single layer of decomposition, the sub-band decomposition can provide a decomposition of four sub-bands with 3 channels per sub-band while combining all the channels across all the sub-bands, thereby resulting in a total of 12 channels, where each of the channels now has half the length and width of the original input image. Detailed architectural parameters used for experimentation are illustrated in Table 3 shown above. Unlike the MSR-CNN architecture 700, the SSR-CNN 800 does not use a mixing layer after the sub-band decomposition because the CNN processes all the sub-bands together. To study the SSR-CNN architecture 800 and for a valid comparison with the MSR-CNN architecture 700, the selection of the CNN structure can involve using a CNN design similar to CNN models such as AlexNet and VGG16 with ResNet connections before each pooling layer. For a valid comparison of the two architectures, the total number of filters at each layer for both MSR-CNN 700 and SSR-CNN 800 were selected to be equal, as shown in Table 3. In addition, the number of fully connected layers (FC) and their parameters at each layer are kept the same for both of the architectures (e.g., MSR-CNN 700 and SSR-CNN 800) to enable a valid comparison.

In one aspect, the machine learning architecture 800 can execute a process for pattern recognition. First, the process can receive data including a pattern to be recognized. The process can decompose the data into a plurality of sub-bands, where each of the plurality of sub-bands is equal in size. The process can combine the plurality of sub-bands. The process can then process the combined sub-bands with a single convolutional neural network (CNN). The process can aggregate output of the CNN. The process can train, using the aggregated output, the CNN to recognize the pattern.

First Example Apparatus

Figure 9:
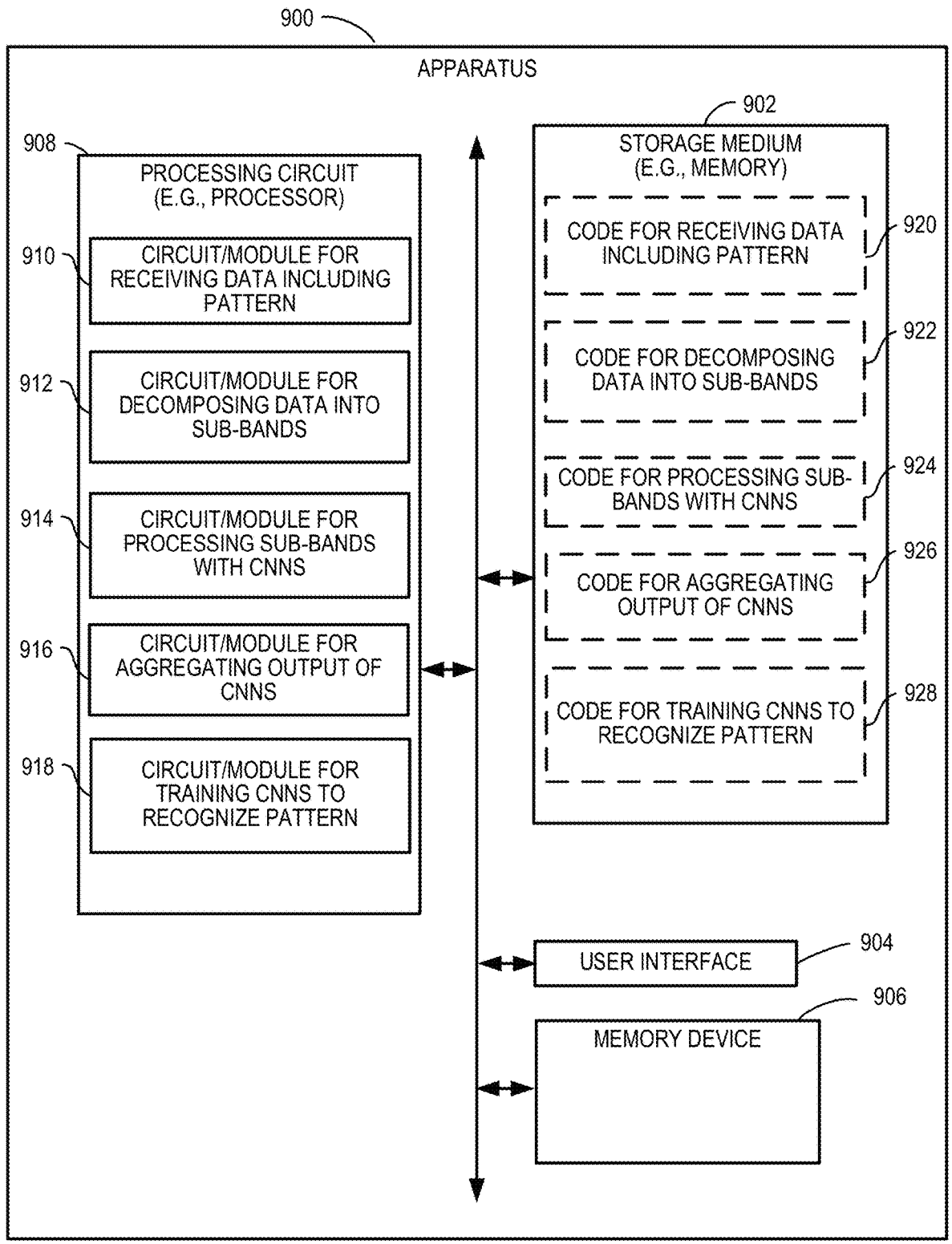
FIG. 9 is a block diagram illustrating an example hardware implementation for an apparatus (e.g., an electronic device) that can support machine learning in accordance with some aspects of the disclosure.

FIG. 9 is a block diagram illustrating an example hardware implementation for an apparatus (e.g., an electronic device) 900 that can support machine learning in accordance with some aspects of the disclosure. The apparatus 900 includes a storage medium 902, a user interface 904, a memory device (e.g., a memory circuit) 906, and a processing circuit 908 (e.g., at least one processor). In various implementations, the user interface 904 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 9. The signaling bus may include any number of interconnecting buses and bridges depending on the specific application of the processing circuit 908 and the overall design constraints. The signaling bus links together various circuits such that each of the storage medium 902, the user interface 904, and the memory device 906 are coupled to and/or in electrical communication with the processing circuit 908. The signaling bus may also link various other circuits (not shown) such as timing sources, peripherals, voltage regulators, and power management circuits, which are well known in the art, and therefore, will not be described any further.

The memory device 906 may represent one or more memory devices. In some implementations, the memory device 906 and the storage medium 902 are implemented as a common memory component. The memory device 906 may also be used for storing data that is manipulated by the processing circuit 908 or some other component of the apparatus 900.

The storage medium 902 may represent one or more computer-readable, machine-readable, and/or processor-readable devices for storing programming, such as processor executable code or instructions (e.g., software, firmware), electronic data, databases, or other digital information. The storage medium 902 may also be used for storing data that is manipulated by the processing circuit 908 when executing programming. The storage medium 902 may be any available media that can be accessed by a general purpose or special purpose processor, including portable or fixed storage devices, optical storage devices, and various other mediums capable of storing, containing or carrying programming.

By way of example and not limitation, the storage medium 902 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, a key drive, or a solid state drive (SSD)), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 902 may be embodied in an article of manufacture (e.g., a computer program product). By way of example, a computer program product may include a computer-readable medium in packaging materials. In view of the above, in some implementations, the storage medium 902 may be a non-transitory (e.g., tangible) storage medium. For example, the storage medium 902 may be a non-transitory computer-readable medium storing computer-executable code, including code to perform operations as described herein.

The storage medium 902 may be coupled to the processing circuit 908 such that the processing circuit 908 can read information from, and write information to, the storage medium 902. That is, the storage medium 902 can be coupled to the processing circuit 908 so that the storage medium 902 is at least accessible by the processing circuit 908, including examples where at least one storage medium is integral to the processing circuit 908 and/or examples where at least one storage medium is separate from the processing circuit 908 (e.g., resident in the apparatus 900, external to the apparatus 900, distributed across multiple entities, etc.).

Programming stored by the storage medium 902, when executed by the processing circuit 908, causes the processing circuit 908 to perform one or more of the various functions and/or process operations described herein. For example, the storage medium 902 may include operations configured for regulating operations at one or more hardware blocks of the processing circuit 908.

The processing circuit 908 is generally adapted for processing, including the execution of such programming stored on the storage medium 902. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 908 is arranged to obtain, process and/or send data, control data access and storage, issue commands, and control other desired operations. The processing circuit 908 may include circuitry configured to implement desired programming provided by appropriate media in at least one example. For example, the processing circuit 908 may be implemented as one or more processors, one or more controllers, and/or other structure configured to execute executable programming. Examples of the processing circuit 908 may include a general purpose processor, a graphics processing unit (GPU), a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 908 may also be implemented as a combination of computing components, such as a combination of a GPU and a microprocessor, a DSP and a microprocessor, a number of microprocessors, one or more microprocessors in conjunction with a DSP core, an ASIC and a microprocessor, or any other number of varying configurations. These examples of the processing circuit 908 are for illustration and other suitable configurations within the scope of the disclosure are also contemplated.

According to one or more aspects of the disclosure, the processing circuit 908 may be adapted to perform any or all of the features, processes, functions, operations and/or routines for any or all of the apparatuses described herein. For example, the processing circuit 908 may be configured to perform any of the steps, functions, and/or processes described with respect to FIGS. 1-8 and 10. As used herein, the term "adapted" in relation to the processing circuit 908 may refer to the processing circuit 908 being one or more of configured, employed, implemented, and/or programmed to perform a particular process, function, operation and/or routine according to various features described herein.

The processing circuit 908 may be a specialized processor, such as a GPU or an application-specific integrated circuit (ASIC) that serves as a means for (e.g., structure for) carrying out any one of the operations described in conjunction with FIGS. 1-8 and 10. The processing circuit 908 serves as one example of a means for performing the functions of any of the circuits/modules contained therein. In various implementations, the processing circuit 908 may provide and/or incorporate, at least in part, the functionality described above for the machine learning architectures of FIGS. 1-8 and 10.

According to at least one example of the apparatus 900, the processing circuit 908 may include one or more of a circuit/module for receiving data including a pattern to be recognized 910, a circuit/module for decomposing the data into a plurality of sub-bands 912, a circuit/module for processing each of the plurality of sub-bands with a respective CNN to generate a plurality of outputs 914, a circuit/module for aggregating outputs of the CNNs 916, or a circuit/module for training, using the aggregated output, the CNNs to recognize the pattern 918. In various implementations, the circuit/module for receiving data including a pattern to be recognized 910, a circuit/module for decomposing the data into a plurality of sub-bands 912, a circuit/module for processing each of the plurality of sub-bands with a respective convolutional neural network (CNN) 914, a circuit/module for aggregating output of the CNNs 916, or a circuit/module for training, using the aggregated output, the CNNs to recognize the pattern 918 may provide and/or incorporate, at least in part, the functionality described above for the machine learning architecture 100 of FIG. 1 or the machine learning architecture 700 of FIG. 7.

As mentioned above, programming stored by the storage medium 902, when executed by the processing circuit 908, causes the processing circuit 908 to perform one or more of the various functions and/or process operations described herein. For example, the programming may cause the processing circuit 908 to perform the various functions, steps, and/or processes described herein with respect to FIGS. 1-8 and 10 in various implementations. As shown in FIG. 9, the storage medium 902 may include one or more of code for receiving data including a pattern to be recognized 920, code for decomposing the data into a plurality of sub-bands 922, code for processing each of the plurality of sub-bands with a respective convolutional neural network (CNN), wherein each of the CNNs operates independently of the other CNNs 924, code for aggregating output of the CNNs 926, or code for training, using the aggregated output, the CNNs to recognize the pattern 928 that may be executed or otherwise used to provide the functionality described herein for the circuit/module for receiving data including a pattern to be recognized 910, the circuit/module for decomposing the data into a plurality of sub-bands 912, the circuit/module for processing each of the plurality of sub-bands with a respective convolutional neural network (CNN) 914, the circuit/module for aggregating output of the CNNs 916, or the circuit/module for training, using the aggregated output, the CNNs to recognize the pattern 918.

First Example Process

Figure 10:
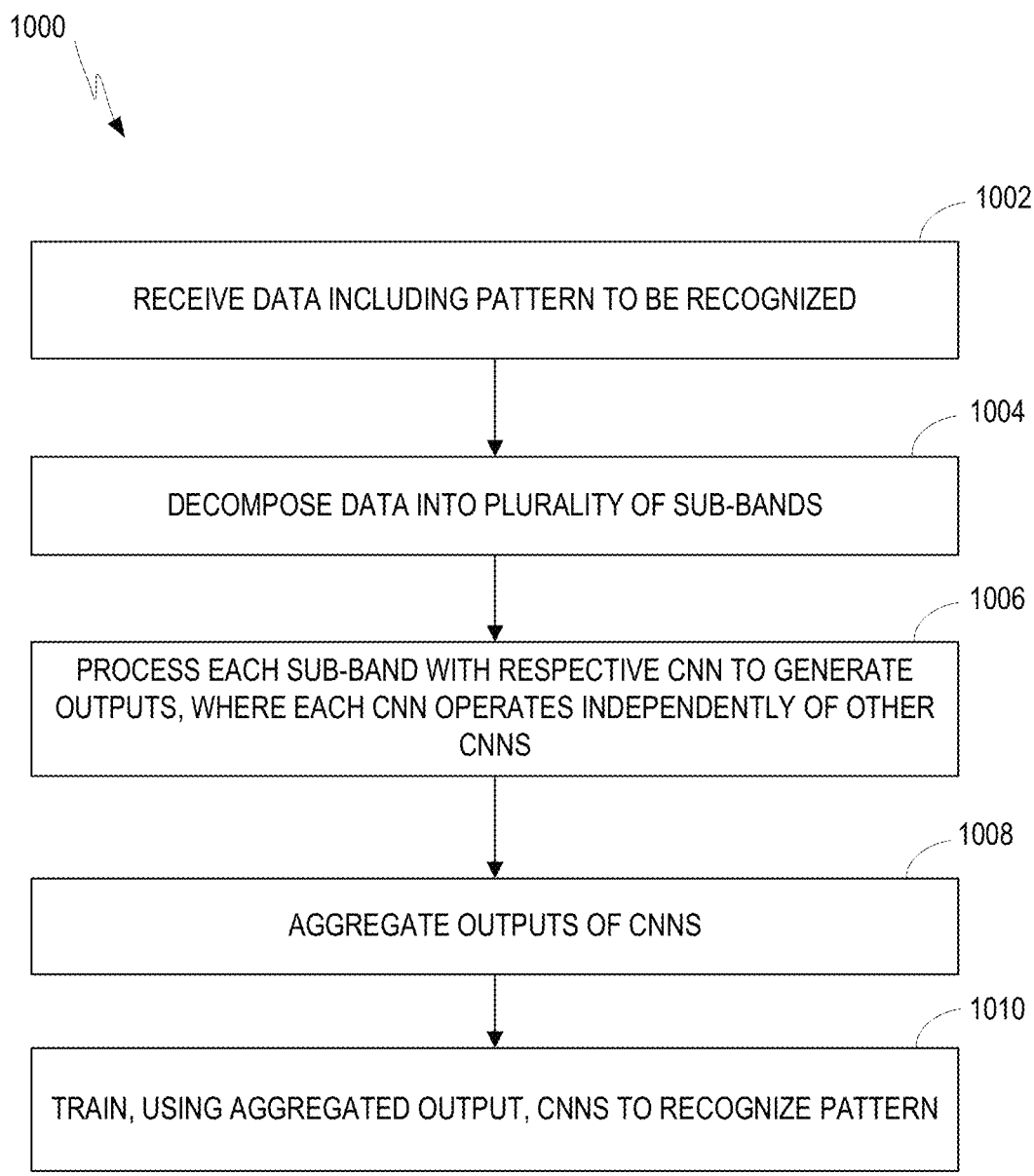
FIG. 10 is a flowchart illustrating an example process for operating a machine learning architecture in accordance with some aspects of the disclosure.

FIG. 10 is a flowchart illustrating an example process 1000 for operating a machine learning architecture in accordance with some aspects of the disclosure. The process 1000 may take place within a processing circuit (e.g., the processing circuit 908 of FIG. 9), which may be located in a suitable apparatus (e.g., apparatus 900, SRCNN 100, or MSR-CNN 700). Of course, in various aspects within the scope of the disclosure, the process 1000 may be implemented by any suitable apparatus capable of supporting machine learning operations.

At block 1002, an apparatus (e.g., a machine learning architecture and/or a processing circuit) receives data including a pattern to be recognized. For example, the data can be any of one dimensional (e.g., voice/audio or communication signals), two dimensional (e.g., image), and/or three dimensional (e.g., video). In one example, the data is an image including one or more patterns.

At block 1004, the apparatus decomposes the data into a plurality of sub-bands. In one aspect, a sub-band decomposition block/circuit/module (e.g., 104, 204, 304, 404, 704, 804, or 912) can perform this function. In one aspect, the apparatus decomposes the data into a plurality of sub-bands that have equal size with respect to one another. In one aspect, the apparatus decomposes the data into a plurality of sub-bands that have unequal size with respect to one another. In one aspect, the sub-band decomposition block/circuit/module includes a plurality of filters with fixed settings. In one aspect, the sub-band decomposition block/circuit/module includes a plurality of filters with adjustable settings, and the settings may be periodically modified using feedback in the form of training data from one or more CNNs. In one aspect, prior to the decomposition of block 1004, the apparatus performs data pre-processing as needed. Sometimes, depending on the application, input data could be massaged before sending it to the CNN, including things like denoising, subtracting any bias present in the signal or normalizing the signal can be done, and in certain applications they give better performance.

At block 1006, the apparatus processes each of the plurality of sub-bands with a respective convolutional neural network (CNN) to generate a plurality of outputs, where each of the CNNs operates independently of the other CNNs. In one aspect, a sub-band channel block/circuit/module (e.g., 106-X, 712-X, or 914) having a single CNN can perform this function.

At block 1008, the apparatus aggregates the outputs of the CNNs. In one aspect, one or more fully connected layers (e.g., 108-X, 714-X, or 916) can perform this function.

At block 1010, the apparatus trains, using the aggregated output, the CNNs to recognize the pattern. In one aspect, the machine learning block/circuit/module (e.g., 100, 700, or 800) can perform this function. In one aspect, this function can involve, or be referred to as, back propagation. Back propagation is a technique where error derivatives can be passed all the way from the output to a layer before, and so on till the error derivative reaches the very input layer. In back propagation, the error derivatives provide a quantitative measure of how much to update the error such that the overall error reduces. The back propagation can be responsible for updating the weights in the FC layers, in the CNN layers and also the sub-band decomposition layers where the decomposition is adaptive.

In one aspect, the process further includes mixing, after the sub-band decomposition at block 1004, the plurality of sub-bands to form a plurality of mixed sub-bands. In such case, at block 1006, the apparatus processes each of the plurality of mixed sub-bands with the respective CNN to generate the plurality of outputs. In one aspect, these functions can be performed by the machine learning architecture/circuit 700 of FIG. 7, including, for example, mixing structure 708.

In one aspect, additional functions, such as those described above for the machine learning architectures of FIGS. 1-9, can be performed as part of this process.

Some Properties of the Proposed Machine Learning Architectures

Referring now to the machine learning architectures of FIGS. 1-7, the sub-band decomposition of the input image enables the network to analyze isolated sub-bands. Corruption of the input image by noise, lens aberration, incorrect exposure, low lighting condition, burst of transmission noise, etc. may affect certain spectral bands more than the others. Sub-band decomposition allows the machine learning architectures/apparatus to isolate the corrupted bands such that only the CNNs in those corrupted bands might be affected. This leads to a robust feature extraction system as compared to a single CNN analysis of the entire spectrum.

Learning the sub-band decomposition filter structure (e.g., using the ATS or LTS transforms of FIGS. 3 and 4) allows for even distribution of sub-band utilization. Since error derivatives can propagate equally on all sub-band branches, and since all weights prior to training can be initialized randomly, the resulting machine learning architectures provide for better utilization of information processing on each sub-band as compared to having fixed sub-band filter structures like that in the case of a wavelet based sub-band filter structure (e.g., wavelet transform 204 of FIG. 2). However, fixed transforms like the wavelet transform 204 help to minimize the computational cost and also may require fewer parameters to train on. This comes at a cost of marginally reduced classification accuracy, thereby providing the designer with options to adjust for optimization. Sub-band decomposition in general brings a higher degree of sparsity, specifically in the non-baseband portions of the spectra which mostly contain edge information of the input image. This sparsity is introduced at the very input of the sub-band CNNs, and can help to reduce CNN complexity (e.g., along the sub-band). Thus, processing sub-bands individually can lead to a substantial reduction of the computational cost. The complexity of a CNN may be determined by:

$$O\left(\sum_{i=0}^{I} f_{(i-1)} \cdot s_i^2 \cdot f_i \cdot p_i^2\right)$$

where i is the CNN layer index number, I is the total number of CNN layers, $f_i$ is the number of filters in layer i, $f_{(i-1)}$ is also referred to as the number of input channels at the ith layer, $s_i$ is the spatial size of the filter, and $p_i$ is the spatial size of the output feature map. In one aspect, sub-band decomposition can reduce the parameter $p_i$ by half along both length and breadth for every decomposition layer, resulting in major reductions in the computational cost. Sub-band decomposition of the input image results in a reduction of input spatial dimensions along rows and columns, each by $2^M$, where M is the number of decomposition layers. The total reduction of input dimension along each sub-band is exponential and is effectively given by $4^M$ for two-dimensional input data such as images. The cost of the convolution operation in a CNN, which accounts for the bulk of computations, depends super-linearly on the size of the convolution filters, and the sample point count per dimension, all of which are reduced significantly in embodiments presented herein. This disclosure demonstrates that the reduction in computations required for forward-pass and back-propagation (single-iteration) to be over 90% and 75%, respectively. In the case of wavelet based sub-band decomposition, a special case, the sub-band decomposition incurs no loss of input information due to lossless sub-band decomposition from the wavelet coefficients. Details are presented in the results section and summarized in Table 4 and Table 5.

other. This remains an advantage even in the back propagation path. The algorithm offers a higher degree of parallelism.

The quantization of weights poses a challenge to practical CNN implementations, where storage and computation in 64-bit floating point representation may become impossible. In the sub-band regularized CNN architecture, quantization noise from each weight is confined within a sub-band and may not affect the entire spectrum compared to a regular CNN, where the quantization noise from every weight can potentially corrupt the entire spectrum. The results presented herein indicate that compared to regular CNN, the sub-band architectures presented in this disclosure are more robust with respect to weight quantization.

Images in general are compressed before storage or transmission, which results in input quantization noise spread unevenly across the spectrum. The sub-band architectures presented in this disclosure offer greater robustness to input quantization noise compared to regular CNNs as will be shown.

Experimental Setup and Results

In this disclosure, experimental results using MNIST, CIFAR-10/100, Caltech-101, and ImageNet-2012 datasets

TABLE 4

Comparison of computation reduction in at inference. The architectural configurations are described in Table 1, corresponding to the Caltech-101 data-set and input dimension 224 × 224 × 3.

| | Conv Layer | | ReLU | Pool | Softmax | | | Total | | Total % Reduction | |
|---|---|---|---|---|---|---|---|---|---|---|---|
| | Adder | Myp | Myp | Myp | Exp Count | Adder | Divide | Adder | Myp | Adder | Myp |
| BCNN | 3.73E+10 | 2.62E+10 | 1.65E+04 | 1.65E+04 | 1.02E+03 | 1.02E+03 | 1.02E+03 | 3.73E+10 | 2.62E+10 | | |
| SSR-CNN with WTS (1L-DWT) | 9.38E+09 | 9.39E+09 | 1.65E+04 | 1.65E+04 | 1.02E+03 | 1.02E+03 | 1.02E+03 | 9.38E+09 | 9.39E+09 | 74.81 | 64.14 |
| MSR-CNN with WTS (1L-DWT) | 2.39E+09 | 2.40E+09 | 1.65E+04 | 1.65E+04 | 1.02E+03 | 1.02E+03 | 1.02E+03 | 2.39E+09 | 2.40E+09 | 93.58 | 90.83 |
| SSR-CNN with WTS (2L-DWT) | 2.42E+09 | 2.42E+09 | 1.65E+04 | 1.65E+04 | 1.02E+03 | 1.02E+03 | 1.02E+03 | 2.42E+09 | 2.42E+09 | 93.50 | 90.76 |
| MSR-CNN with WTS (2L-DWT) | 2.98E+08 | 2.72E+08 | 1.65E+04 | 1.65E+04 | 1.02E+03 | 1.02E+03 | 1.02E+03 | 2.58E+08 | 2.72E+08 | 99.31 | 98.96 |

TABLE 5

Comparison of computation reduction at back-propagation. The architectural configurations are described in Table 2, corresponding to the Caltech-101 data-set and input dimension 224 × 224 × 3.

| | Conv Layer | | ReLU | Pool | Softmax | | Total | | Total % Reduction | |
|---|---|---|---|---|---|---|---|---|---|---|
| | Adder | Myp | Myp | Myp | Adder | Myp | Adder | Myp | Adder | Myp |
| BCNN | 3.24E+07 | 7.09E+08 | 1.65E+04 | 1.65E+04 | 1.02E+03 | 1.02E+03 | 3.24E+07 | 7.09E+08 | | |
| SSR-CNN with WTS (1L-DWT) | 1.02E+07 | 1.83E+08 | 4.12E+03 | 4.12E+03 | 1.02E+03 | 1.02E+03 | 1.02E+07 | 1.83E+08 | 68.66 | 74.18 |
| MSR-CNN with WTS (1L-DWT) | 8.12E+06 | 1.81E+08 | 1.65E+04 | 1.65E+04 | 1.02E+03 | 1.02E+03 | 8.12E+06 | 1.81E+08 | 74.97 | 74.47 |
| SSR-CNN with WTS (2L-DWT) | 4.62E+06 | 4.89E+07 | 1.03E+03 | 1.03E+03 | 1.02E+03 | 1.02E+03 | 4.62E+06 | 4.89E+07 | 85.77 | 93.10 |
| MSR-CNN with WTS (2L-DWT) | 1.03E+06 | 2.43E+07 | 8.23E+03 | 8.23E+03 | 1.02E+03 | 1.02E+03 | 1.03E+06 | 2.43E+07 | 96.81 | 96.57 |

The decomposition into sub-bands results in more parallelism in the algorithm due to the structured approach. The structure allows for independent processing of each of the sub-bands in parallel. In contrast, in approaches such as a regular full-band CNN, each layer is processed one after the are discussed. For the MNIST dataset, the experiments used 60,000 training and 10,000 test images of resolution 28×28 and a total of 10 classes representing 0 to 9. For the CIFAR-0/100 dataset, the experiments used 50,000 training and 10,000 test images of size 32×32×3, with a total of 10 and 100 classes for CIFAR-10 and CIFAR-100, respectively.

For the CALTECH-101 dataset, the experiments used 6403 training and 2741 test images, each roughly 300×200 pixels. There are a total of 102 classes (one-background) and about 40 to 800 images per class. For the IMAGENET-2012 dataset, the experiments used 247,856 test and 50,000 validation images. There are a total of 1000 validation classes. Images from both Caltech-101 and ImageNet-2012 datasets being non-uniform were re-sized to dimensions 256×256×3 using a Lanczos-3 kernel, maintaining vector processing.

Figure 11:
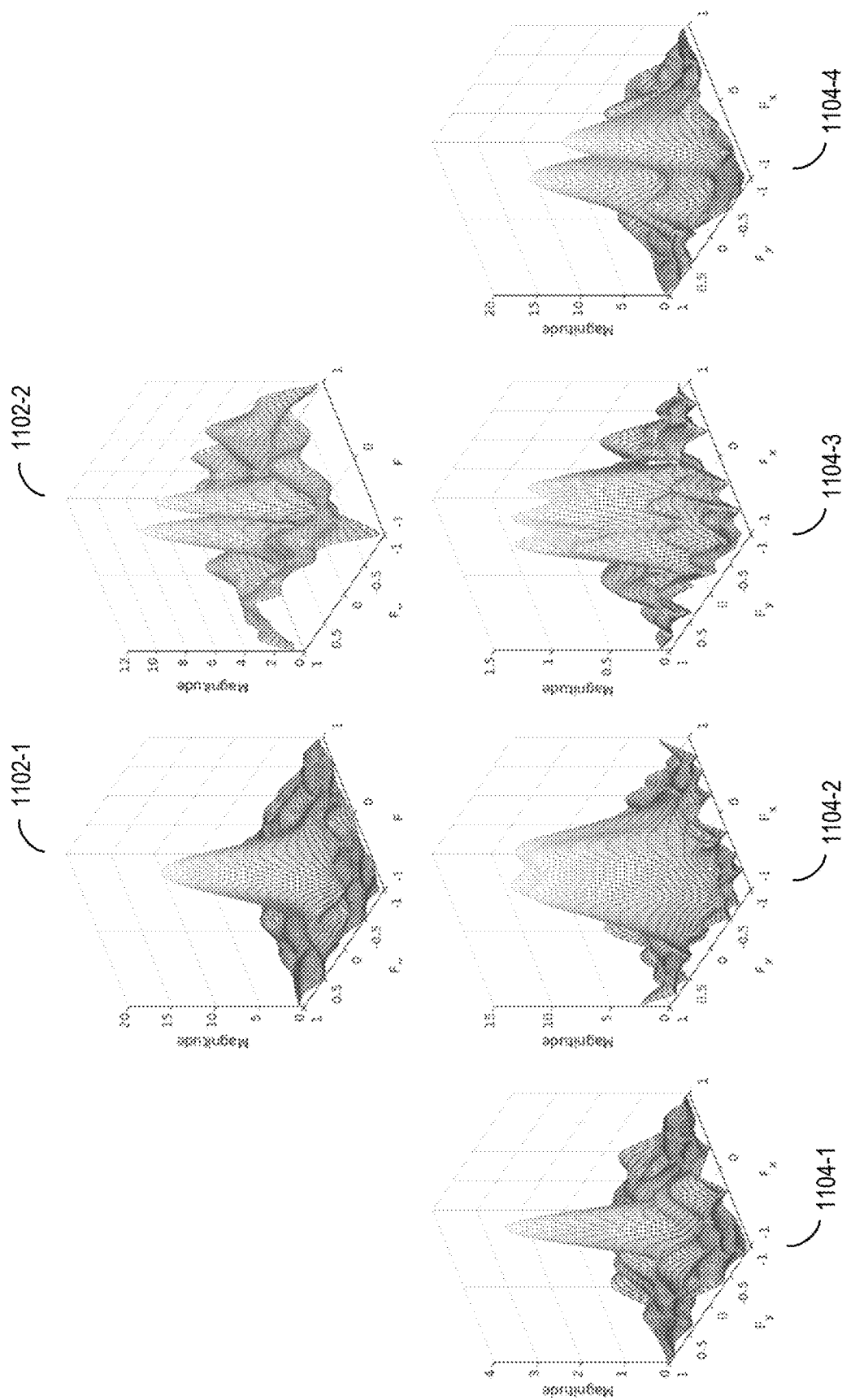
FIG. 11 is a perspective view of the frequency responses of various filters that can be used in a sub-band decomposition architecture in accordance with some aspects of the disclosure.

FIG. 11 is a perspective view of the frequency responses of various filters (1102-1, 1102-2, 1104-1, 1104-2, 1104-3, 1104-4) that can be used in a sub-band decomposition architecture in accordance with some aspects of the disclosure. In one aspect, the various filters represent the 2D frequency response of an adaptive transform (e.g., ATS 304 of FIG. 3) having a decomposition filter structure of order 5. The coefficients were trained through back propagating error derivatives all the way up to the sub-band decomposition block. The top row frequency responses (1102-1, 1102-2) are the frequency responses of filters that divide the input spectrum into two parts, while the second row (1104-1, 1104-2, 1104-3, 1104-4) are the responses of filters responsible for generating the final four sub-bands. FIG. 11 shows that the first row filter responses end up being low-pass (1102-1) and high-pass (1102-1), while the second row of filters consists of high-pass (1104-1), band-pass (1104-2), wider range low-pass (1104-3) and sharper low-pass (1104-4) filter frequency responses. The 2D frequencies along Fx and Fy are normalized.

Figure 12:
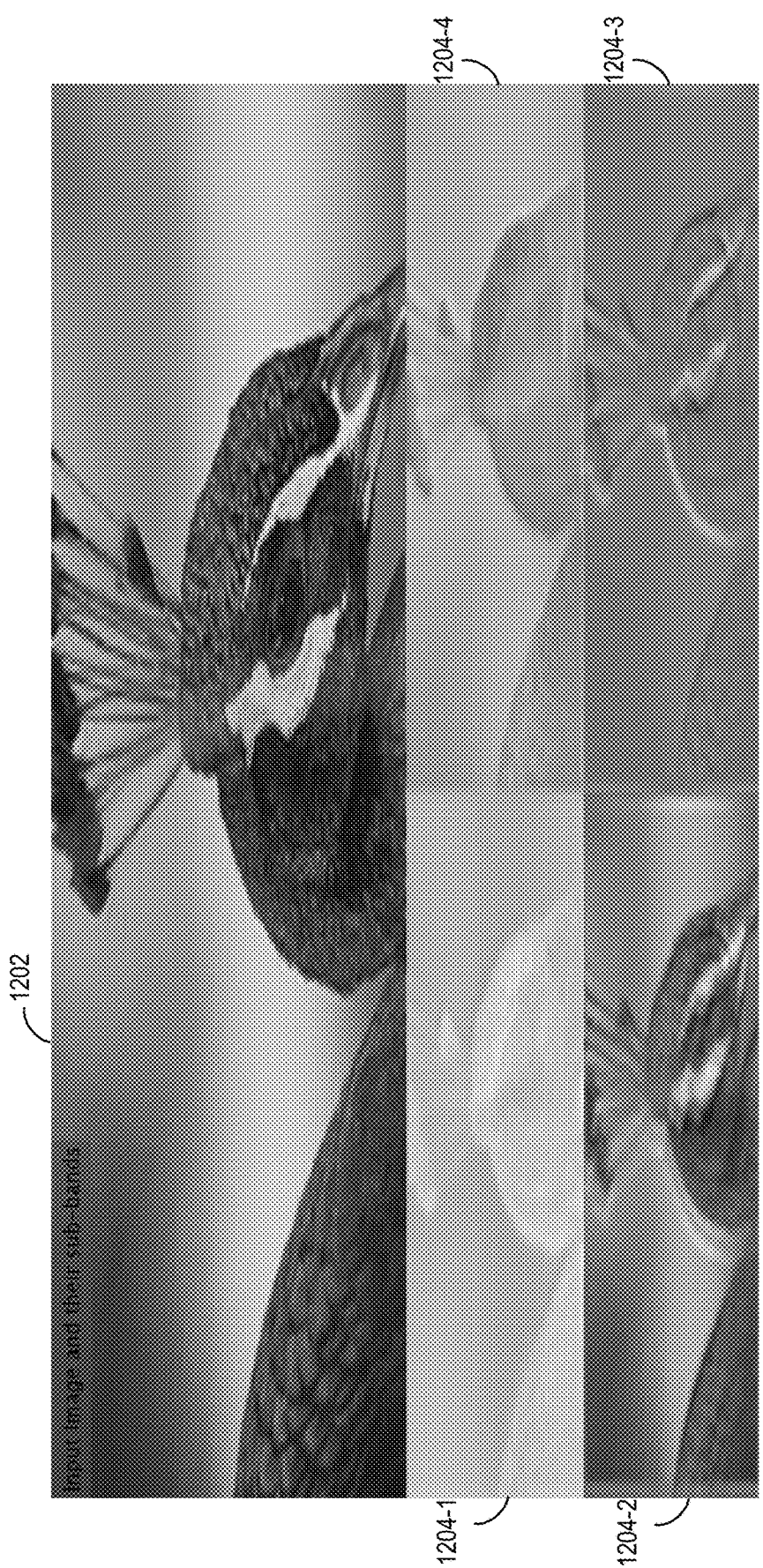
FIG. 12 illustrates an example input image and four decomposed sub-bands that can be used in a sub-band decomposition architecture in accordance with some aspects of the disclosure.

FIG. 12 illustrates an example input image 1202 and four decomposed sub-bands (1204-1, 1204-2, 1204-3, 1204-4) that can be used in a sub-band decomposition architecture (e.g., ATS 304 of FIG. 3) in accordance with some aspects of the disclosure. In one aspect, the four decomposed sub-bands (1204-1, 1204-2, 1204-3, 1204-4) can be generated using the sub-band decomposition architecture 300 and the adaptive transform (ATS) 304 of FIG. 3.

Figure 13:
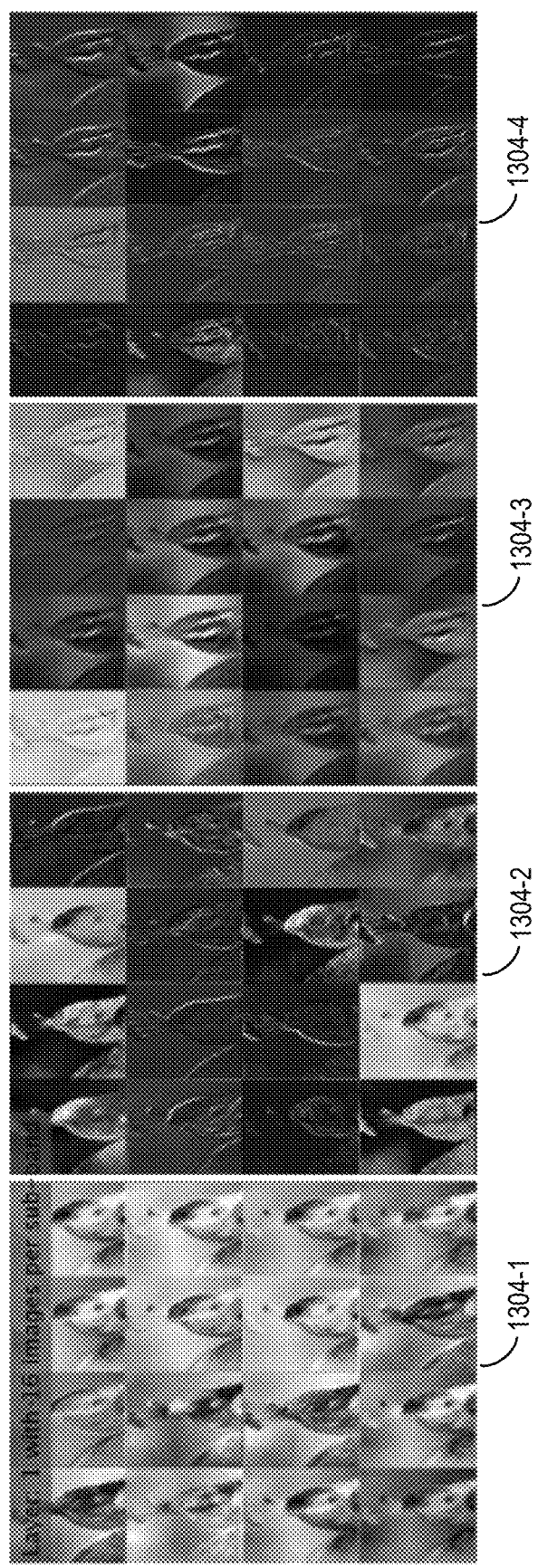
FIG. 13 illustrates an example activation map of a layer-1 output for an example machine learning architecture in accordance with some aspects of the disclosure.

FIG. 13 illustrates an example activation map 1300 of a layer-1 (e.g., with 4 sub-bands, 1304-1 to 1304-4) output for an example machine learning architecture in accordance with some aspects of the disclosure. In one aspect, the activation map 1300, which is simply the output of a convolution block at a given layer, represents the first output layer of the CNN (e.g., one of the CNNs on one of the sub-band channels 712-X) shown in FIG. 7, with 16 images per sub-band (e.g., 16 images in each of the sub-bands 1304-1, 1304-2, 1304-3, and 1304-4). This example continues from the example of FIG. 12 which shows the input image decomposed into four sub-bands (1304-1, 1304-2, 1304-3, 1304-4).

Figure 14:
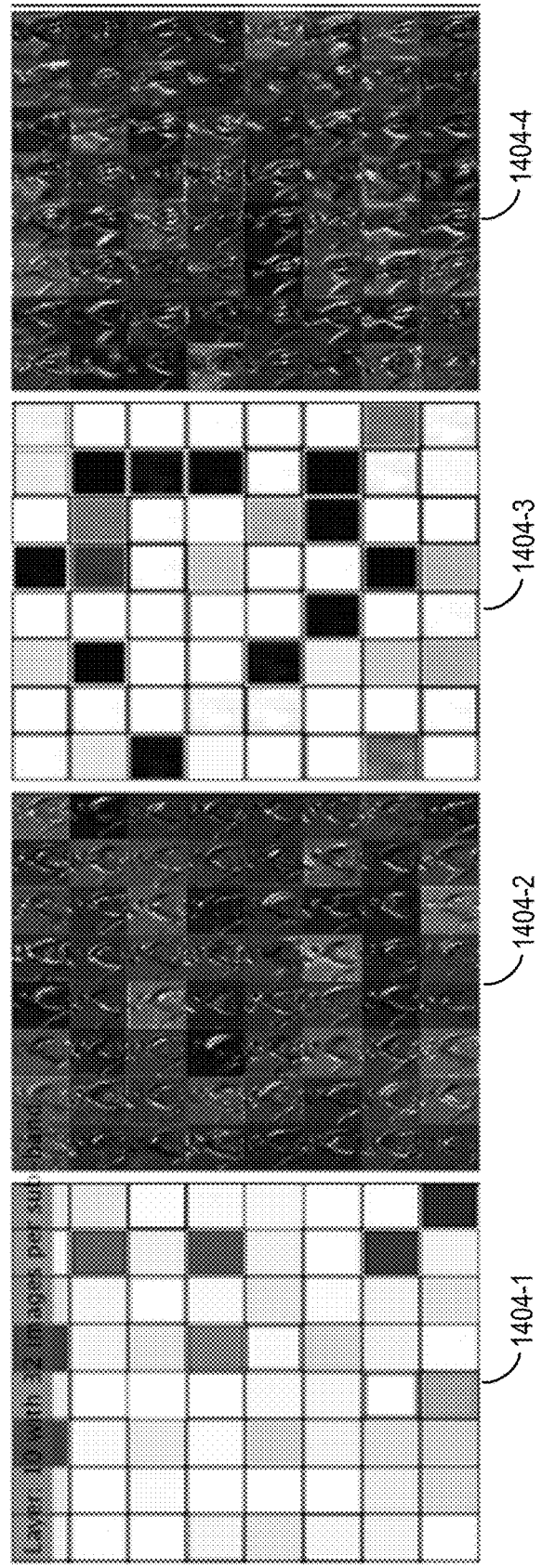
FIG. 14 illustrates an example activation map of a layer-10 output for an example machine learning architecture in accordance with some aspects of the disclosure.

FIG. 14 illustrates an example activation map 1400 of a layer-10 output for an example machine learning architecture in accordance with some aspects of the disclosure. In one aspect, the activation map 1400 represents the layer-10 output of the CNN (e.g., one of the CNNs on one of the sub-band channels 712-X) shown in FIG. 7, with 32 images per sub-band. This example continues from the example of FIG. 12, which shows the input image decomposed into four sub-bands (1404-1, 1404-2, 1404-3, 1404-4).

Figure 15:
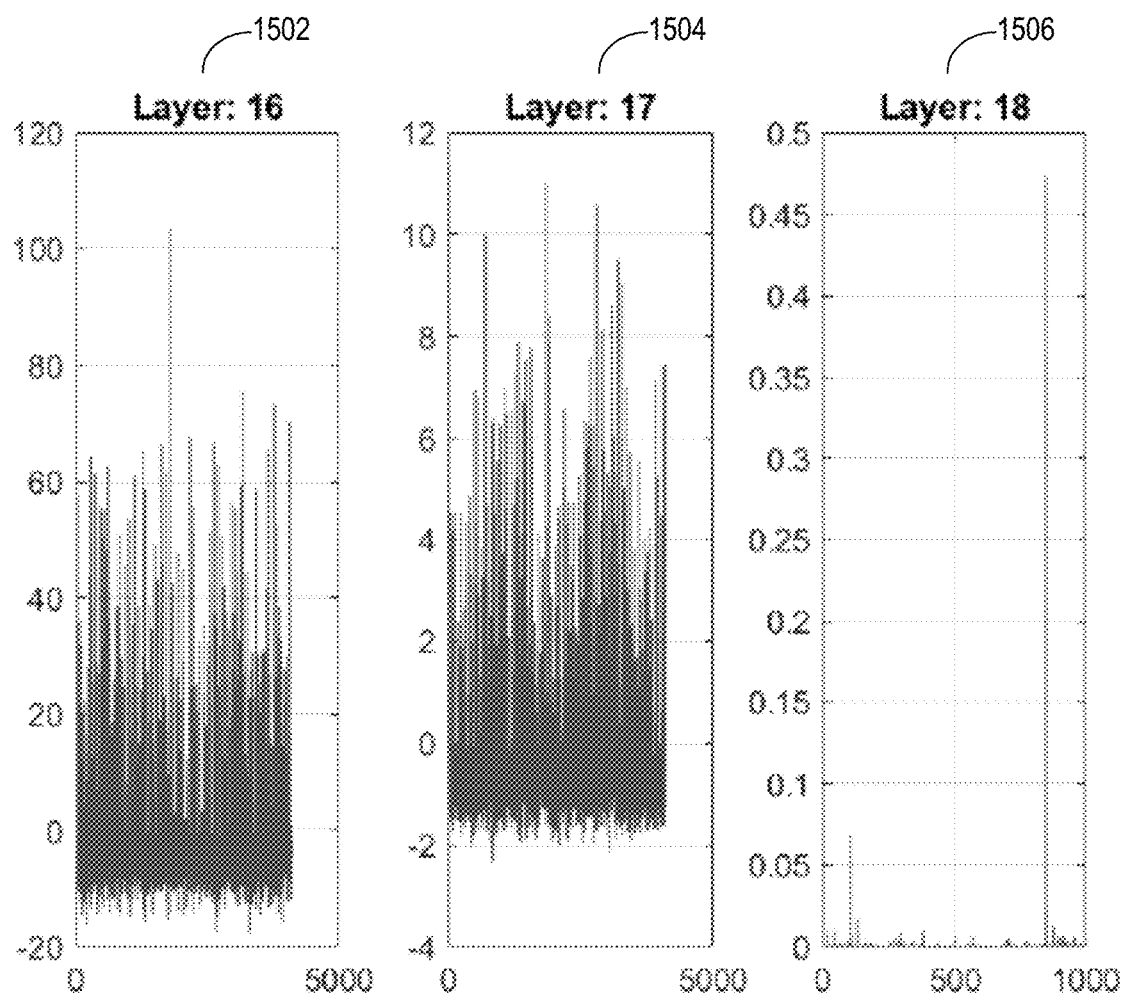
FIG. 15 illustrates example outputs for layer-16, layer-17, and layer 18 for an example machine learning architecture in accordance with some aspects of the disclosure.

FIG. 15 illustrates example outputs for layer-16 (1502), layer-17 (1504), and layer-18 (1506) for an example machine learning architecture in accordance with some aspects of the disclosure. The sole magnitude over 0.45, as illustrated in the layer-18 (1506) output, is indicative of a pattern or object within the input image having been identified (e.g., image classification or pattern recognition). Note that this example continues from the example of FIG. 12 which shows the input image decomposed into the four sub-bands.

Experimental Setup and Results—Models

The base CNN (BCNN) model was the baseline for evaluating the proposed machine learning architectures. For valid comparison, the BCNN was chosen to closely resemble AlexNet and VGG-16 for test purposes. A second benchmark is the transform CNN, or Single-channel Sub-band Regularized CNN (SSR-CNN) architecture, shown in FIG. 8. In one aspect, the architecture can share the same sub-band decomposition frontends as shown in WTS 200, LTS 300 or ATS 400. However, in contrast to SRCNN 100 or MSR-CNN 700, and for the case of SSR-CNN 800, the sub-bands are combined and processed by a single CNN. Equations 4 through 8 remain valid and the output of Equation-3 becomes (X10, . . . , XT0), where T=K×C. K is the number of sub-bands and C is the third dimension of the input image. In contrast to BCNN, and like MSR-CNN, SSR-CNN also benefits from exponential reduction of input data points per dimension due to sub-band decomposition, thereby substantially reducing computational cost. The parameters that determine the learning capacity of a CNN include the number of convolution layers, filters per layer, activation function, arrangement of pooling layers, number of FC layers and the ability to propagate error derivative effectively during back propagation for efficient learning of the weights. Table 1, shown above, shows the parameters of the models. To study the effect of learning in the subspace domain, most of the parameters are kept constant across BCNN, MSRCNN and SSR-CNN. The parameters are tuned heuristically due to the high computation cost of K-fold cross-validation.

Each of the convolutional layers in all three models can use small receptive field filters of size 3×3 pixels. For the MNIST dataset, a smaller network was chosen with 5 convolutional, 2 pooling and 3 FC layers. A larger network of 15 convolutional, 3 pooling and 3 FC layers was chosen for the CIFAR-10/100, Caltech-101 and ImageNet-2012 datasets. A 2-by-2 max pooling was chosen for the pooling layers. The experiments use 50% drop-outs at the first two FC layers to prevent significant over-fitting and this helps reduce the difference in accuracy between training and test sets. At the last FC layer, the experiments use Softmax. The experiments used no other regularization. Softmax is a mathematical operation that results in different outputs that sum up to one. This is ideal when prediction is probability. The Softmax operation can be used at the last stage of the fully connected layer and can be used specifically for image classification type problems where the output is expected to be a probability.

For an input image size of 224×224×3, a 1-Layer decomposed using either of the MSR-CNN (e.g., 700) or SSR-CNN (e.g., 800) embodiments provided 4 sub-bands of size 112×112×3. The number of filters at each layer of the 1-layer decomposed MSR-CNN was kept at ¼th of BCNN per layer, to maintain a valid comparison of the two models. The first layer in BCNN had 64 filters, whereas MSR-CNN had 16 filters per sub-band, which makes it a total of 64 filters across the 4-sub-bands for a 1-layer decomposed architecture. The same was maintained for 2-layer decomposition. For two layer decomposition, an input image size of 224×224×3 yielded 16-sub-bands of size 56×56×3 each.

Experimental Setup and Results—Training

The experiments trained the models using stochastic gradient descent (SGD) with a mini batch size of 64, batch normalized, randomly picked image per mini batch, momentum of 0.9 and weight decay of 0.0005. The update equations for $W^k_i$ are given by:

$$W^k_i(l+1) = W^k_i(l) + V^k_i(l+1) \quad (7)$$

where, $$V^k_i(l+1) = 0.9 \cdot V^k_i(l) - 0.0005 \cdot \epsilon \cdot W^k_i(l) - \epsilon \cdot \frac{\partial L}{\partial W}\bigg|_{W^k_i} \quad (8)$$

Here l is the iteration index, $V^k_i(l)$ is the momentum at the lth iteration and kth sub-band, c the learning rate, and $$\frac{\partial L}{\partial W}\bigg| W^k_i(l)$$

is the average over the lth batch of the derivative of the objective function with respect to $W^k_i$, evaluated at $W^k_i(l)$. The learning rate is initialized to 0.01 and later reduced by 10 when validation error stops improving; repeating few times prior to termination. Experiments showed that over a wide range of training sets, using a learning rate of 0.1, that the networks did not learn at all or experienced minimal learning, while with a learning rate of 0.001, learning was very slow. It seems the best choice of learning rate may be between 0.1 and 0.001. The learning rate 0.01 was selected, which gave provided the results obtained herein. This disclosure has not optimized this hyper-parameter further. The experiments initialized the weights by drawing from a Gaussian distribution with a standard deviation of 0.01. All biases are initialized to 1.

At training, the only pre-processing done was data augmentation, where the experiments randomly picked patches of size 224×24 from the four corners and the center of the image. The overlap between the images reflects translation in the images from patch to path, thereby preventing data repetition in the training set and helping data augmentation. To these images, the experiments added Gaussian noise of mean and variance equal to those of each sub-band. This added sub-band channel distortion increases the total training image space tenfold. The experiments found that without such data augmentation, the model is highly over-fitting. During testing, the experiments pick 5 patches, four from the four corners and one from the center. Predictions on these 5 patches are averaged to obtain the final result.

Each model was trained on a GTX-1080-Ti GPU with Nvidia CUDA & cuDNN libraries. The following four parallel threads are run in pipeline: (i) Read mini-batch from disk and re-size images, (ii) Compute data augmentation, (iii) Compute 2D-DWT on CPU, and (iv) Transfer data to GPU, compute and read-back. The GPU computation was the bottleneck, thereby resulting in almost free processing time for rest of the parallel threads per mini-batch. Pipeline fill and flush are processed accordingly with pipeline overhead being insignificant compared to total processing time.

Experimental Setup and Results—Results

The 1-Layer MSR-CNN improves the state-of-the-art performance for MNIST, CIFAR-10 and CIFAR-100 datasets by a fair margin. Table 4 summarizes the results. Replacing the 1-layer DWT with a 2-layer DWT decomposition, i.e., with a 2-Layer sub-band decomposition or 16 sub-bands, we achieve an accuracy of 84.37% for SSR-CNN and 88.93% for MSR-CNN, for Caltech-101 dataset. The 2-Layer MSRCNN is 0.54% short of state-of-the-art classification accuracy that uses a very complex structure of spatial pyramid pooling in CNN.

Figure 16:
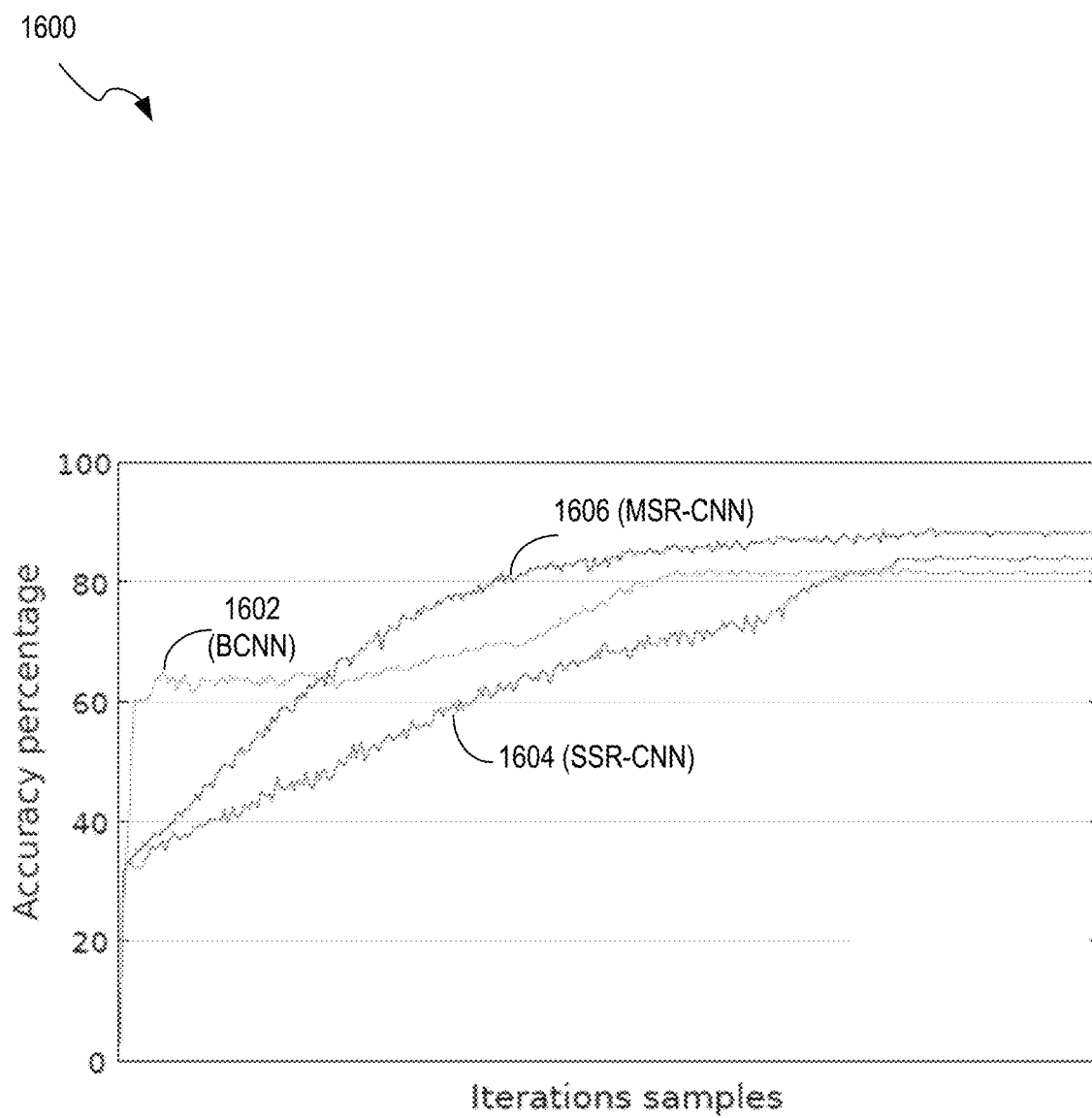
FIG. 16 is a graph illustrating a test error comparison for various machine learning architectures applied to a test data set in accordance with some aspects of the disclosure.

FIG. 16 is a graph 1600 illustrating a test error comparison for various machine learning architectures applied to a test data set in accordance with some aspects of the disclosure. More specifically, graph 1600 compares the test-set error curves of BCNN 1602 and 2-Layer DWT models of SRCNN 1604 and MSR-CNN 1606 for the Caltech-101 dataset. We find that the accuracy of both 1-layer and 2-layer DWT models converges closely. The 2-layer models exceed accuracy compared to its 1-layer counterpart. The difference in the test error calculated at different points in the training indicate that MSR-CNN 1606 has a milder monotonically increasing graph before settling, compared to both BCNN 1602 and SSR-CNN 1604. This indicates better learning and regularization of the MSR-CNN architecture. With a 1-Layer sub-band decomposition, MSR-CNN trained on ImageNet-2012, and the experiments achieved top-5 and top-1 validation set accuracy of 81.37% and 63.7%, respectively. AlexNet achieves accuracy of 83% and 62.5%, respectively. However, in contrast to AlexNet, the experiments described here did not perform any architectural hyper-parameter optimization.

Fourth Example Machine Learning Architecture—Autoencoder

Figure 17:
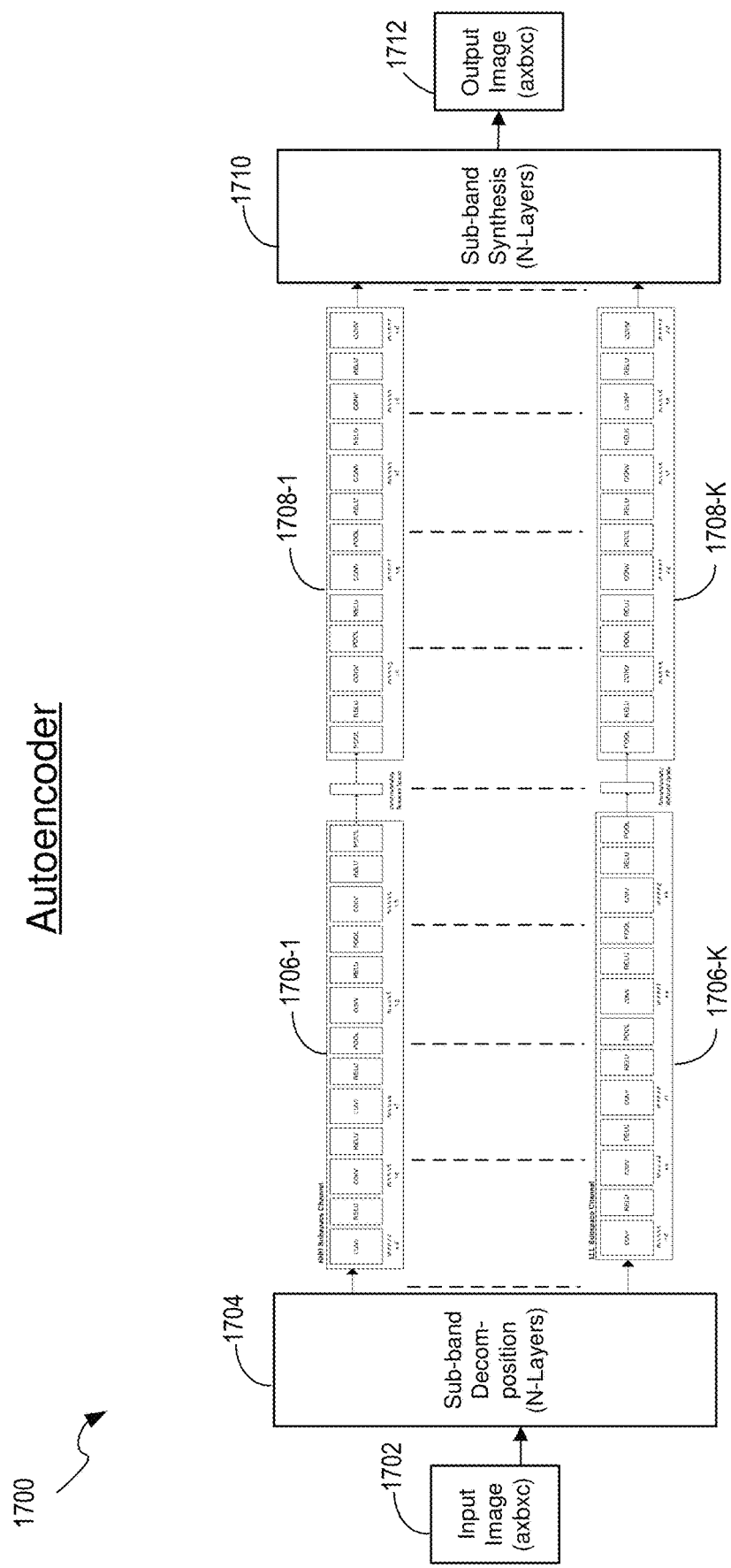
FIG. 17 is a block diagram illustrating an example machine learning architecture including sub-band decomposition, multiple CNNs, and sub-band synthesis that may function as an autoencoder in accordance with some aspects of the disclosure.

FIG. 17 is a block diagram illustrating an example machine learning architecture 1700 including a sub-band decomposition block 1704, multiple CNNs, and sub-band synthesis that may function as an autoencoder in accordance with some aspects of the disclosure. The machine learning architecture 1700 further includes an input image 1702, the sub-band decomposition block 1704, encoding channels (1706-1 . . . 1706-K) with a single CNN per sub-band, decoding channels (1708-1 . . . 1708-K) with a single CNN per sub-band, a sub-band synthesis block 1710, and an output image 1712.

In operation, machine learning architecture 1700 may operate as an autoencoder. The sub-band decomposition block 1704 can receive the input image 1702 and decompose it into multiple sub-bands. The encoding channels (1706-1 . . . 1706-K) can each receive a single sub-band and encode the sub-band data using a single CNN. The decoding channels (1708-1 . . . 1708-K) then receive the encoded sub-band data and decode it using a single CNN. The sub-band synthesis block 1710 can received the decoded output for each sub-band channel and synthesize/combine (e.g., reconstruct) it to form the output image 1712.

In one aspect, the autoencoder can be used to perform image segmentation, where it effectively marks out (e.g., eliminates) a periphery portion around a feature of interest in the input image.

In one aspect, the encoding channels operate in parallel as shown in FIG. 17. In one aspect, the sub-band decomposition block 1704 and encoding channels (1706-1 . . . 1706-K) with the single CNN per sub-band collectively form the encoder section of the autoencoder. The output of the parallel CNN modules in 1706-x can form a reduced dimensionality space, which is then fed to the decoder section of the autoencoder. The decoding channels (1708-1 . . . 1708-K) with the single CNN per sub-band (e.g., parallel CNN structures) and the sub-band synthesis block 1710 form the decoder section that merges all the decoded sub-bands together to reconstruct the synthesized output.

The sub-band decomposition block 1704 can be implemented using a wavelet transform such as the wavelet transform 204 of FIG. 2.

In one aspect, a clustering block can be added between the encoding channels (1706-1 . . . 1706-K) and decoding channels (1708-1 . . . 1708-K) (e.g., in the dimensionality reduced sub-space of the sub-bands). The clustering block can perform clustering using any number of methods, including: partitioning methods such as K-Means Clustering, shirt-mean clustering, PAM, CLARA, CLARANS; density-based methods such as DENCLUE, DBSCAN, OPTICS; grid-based Methods such as STING and Wave Cluster; model based methods such as EM, SOM; hierarchical methods such as Agglomertive Hierarchical Clustering, AGNES, DIANA, BIRCH, BRF, CURE, ROCK; constraint-based clustering; evolutionary algorithm; methods of moments; and other suitable clustering methods.

The clustering block can also perform clustering using any number of blind signal separation methods, including: Principal component analysis; Fisher Linear Discriminant; Independent Component Analysis; Singular Value Decompositions; Non-negative Matrix Factorization; and other suitable methods.

A clustering block/algorithm could be used in the reduced dimensionality space of the autoencoder to segment data patterns. One school of thought to deal with unlabeled data is to first train an autoencoder. An unlabeled data situation may occur where one has many images of animals that one wants to identify, but there is not training that says which are images of cats and which are images of dogs, for example. Instead, one may simply have images of different animals and one wants to identify dog consistently, for example, to show a consistent number each time the image/pattern is a dog and a different number consistently when the image/pattern is a cat. Now all one has to do is associate these numbers to the word "cat" or "dog". So the idea here can be to first input the pictures of the animals at the input, and then train the autoencoder to generate an image as close as possible to a dog. This will allow the autoencoder to learn features that are pertaining to the specific classes, animals in this case. Once the system has learned the features, then with a relatively small number of images of similar animals, the system can train the clustering algorithm.

In one aspect, it is expected that the clustering algorithm gets the input from the reduced dimensionality space, i.e. the output of the encoder, and then, based on the features that it learns during training of the autoencoder, the clustering algorithm will be able to classify the required number of classes. In one aspect, a requirement here for the clustering algorithm can be for the encoder to have learned enough features of specific animals such that the classification based on clustering is possible. In one aspect, this system is now able to identify the classes with training data mostly unlabeled and a very small number of labeled data for correct labeling by the clustering algorithm. This is because the autoencoder is trained with unlabeled data. Similarly, there are other techniques that could be used instead of the clustering algorithm to perform a similar function.

In one aspect, the machine learning architecture 1700, configured as an autoencoder, can include a mixing structure such as the mixing structure 708 of FIG. 7 with the same advantages and benefits that are described above in conjunction with FIG. 7.

Figure 18:
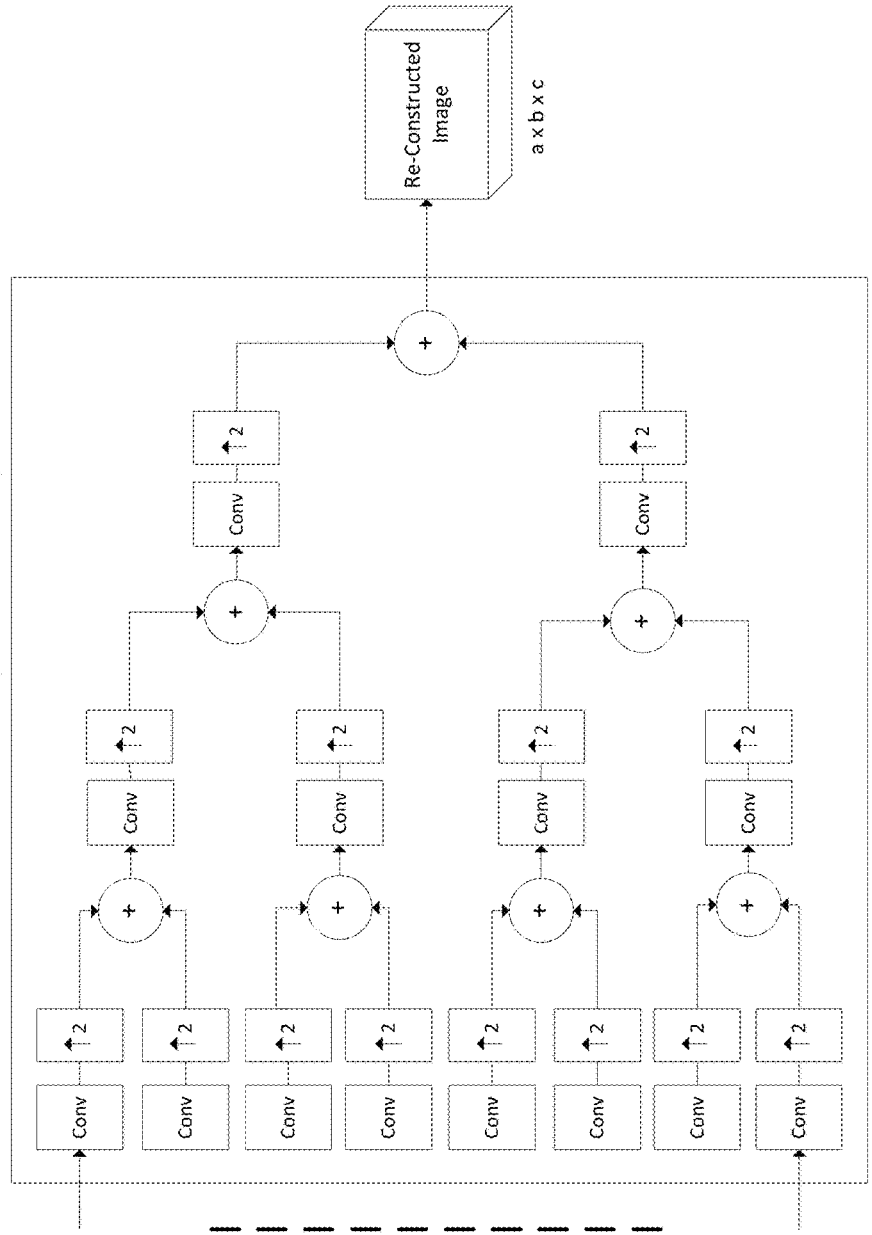
FIG. 18 is a block diagram illustrating an example sub-band synthesis architecture that can be used for sub-band synthesis in accordance with some aspects of the disclosure.

FIG. 18 is a block diagram illustrating an example sub-band synthesis architecture 1800 that can be used for sub-band synthesis for the example machine learning architecture 1700 of FIG. 17 in accordance with some aspects of the disclosure. The sub-band synthesis architecture 1800 employs wavelet synthesis with N layers. The wavelet synthesis module 1800 is similar in concept to a synthesis filter-bank. Each of the sub-band channels can be up-sampled and interpolated with a filter per sub-band, and then added in time domain to reconstruct the full band signal. In the case of wavelet transform based synthesis structure 1800, the reconstruction or the interpolating filter coefficients can be derived using a wavelet basis function similar to wavelet-based synthesis filter bank. In the case of the adaptive decomposition, the interpolating filter coefficients in the synthesis module are adaptive and are learned during the training process through back propagation.

Figure 19:
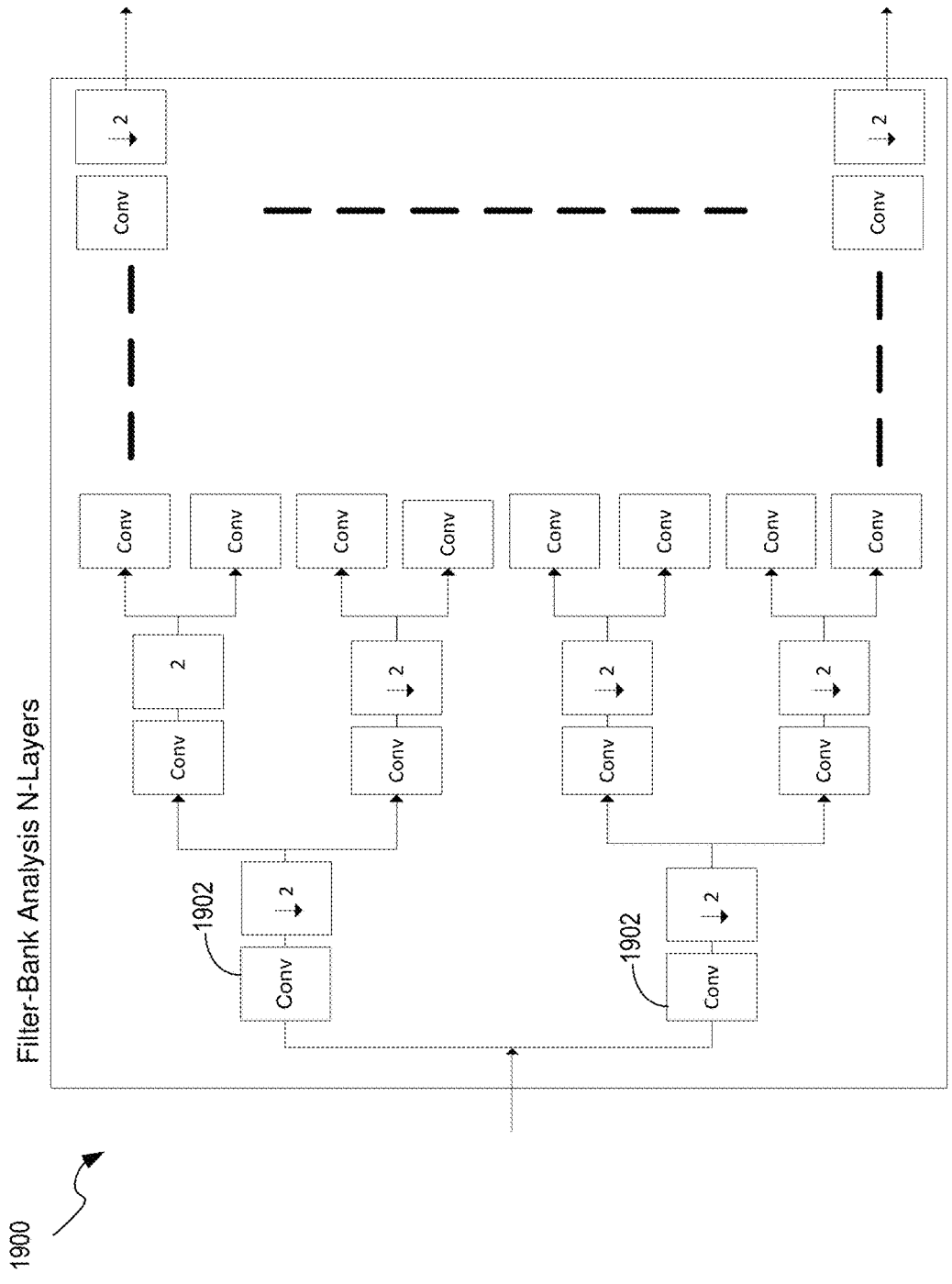
FIG. 19 is a block diagram illustrating an example filter-bank architecture including multiple CNNs that can be used for sub-band decomposition in accordance with some aspects of the disclosure.

FIG. 19 is a block diagram illustrating an example filter-bank architecture 1900 including multiple CNNs 1902 that can be used for sub-band decomposition in accordance with some aspects of the disclosure. In this example, the filter-bank architecture 1900 is used in a machine learning architecture to back-propagate error derivatives all the way to the sub-band decomposition transform coefficients and learn the sub-band transform weights. This filter bank decomposition approach 1900 provides a structure which is very generalized and offers highly structured learning. It can be compared against wavelets, but may be better for a couple of reasons. It may provide better accuracy, and may reduce CNN computation cost for the same reasons. It offers a greater reduction in computation cost over previous architectures.

As shown in FIG. 19, the filter-bank architecture 1900 includes CNNs 1902 at each filter stage. In one aspect, the architecture 1900 can employ a process to identify filters with similar frequency response, and then skip storing the filter coefficients of filters identified as similar. Once a filter is identified, similar filter storage space of filter coefficients is reduced. Once a filter is identified, the process can only store filter coefficients that are identified as unique. The process can skip the computation of filters identified as similar. In order to skip computation of filters, the following criteria may need to be fulfilled. First, the filters may need to match in frequency response. Second, the filter may need to convolve with the same channel number of the input data.

Figure 20:
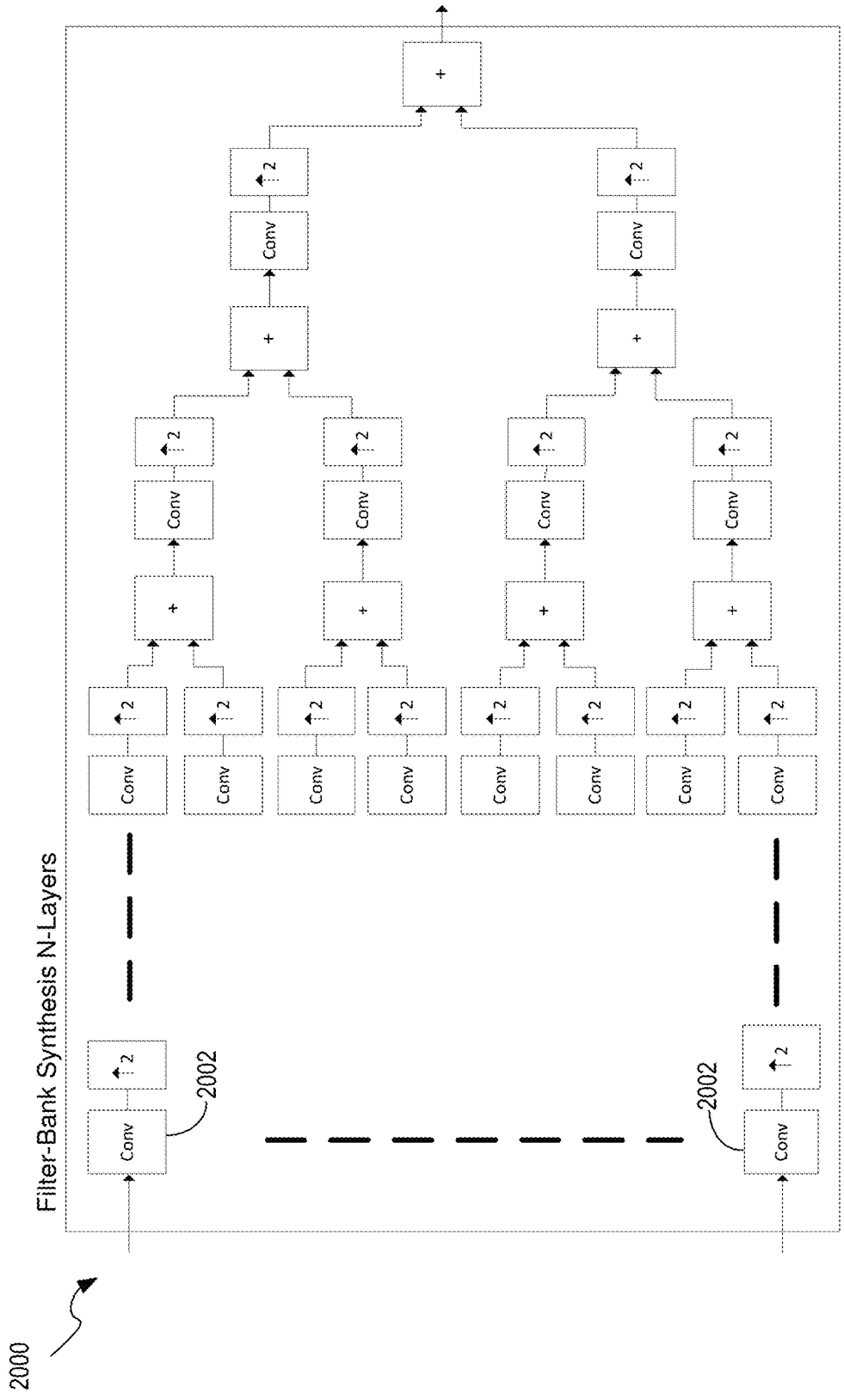
FIG. 20 is a block diagram illustrating an example filter-bank architecture including multiple CNNs that can be used for sub-band synthesis in accordance with some aspects of the disclosure.

FIG. 20 is a block diagram illustrating an example filter-bank architecture 2000 including multiple CNNs 2002 that can be used for sub-band synthesis in accordance with some aspects of the disclosure. This filter-bank architecture 2000 provides all of the features and benefits noted above for the filter-bank architecture 1900 of FIG. 19 that can be used for sub-band decomposition.

Second Example Process

Figure 21:
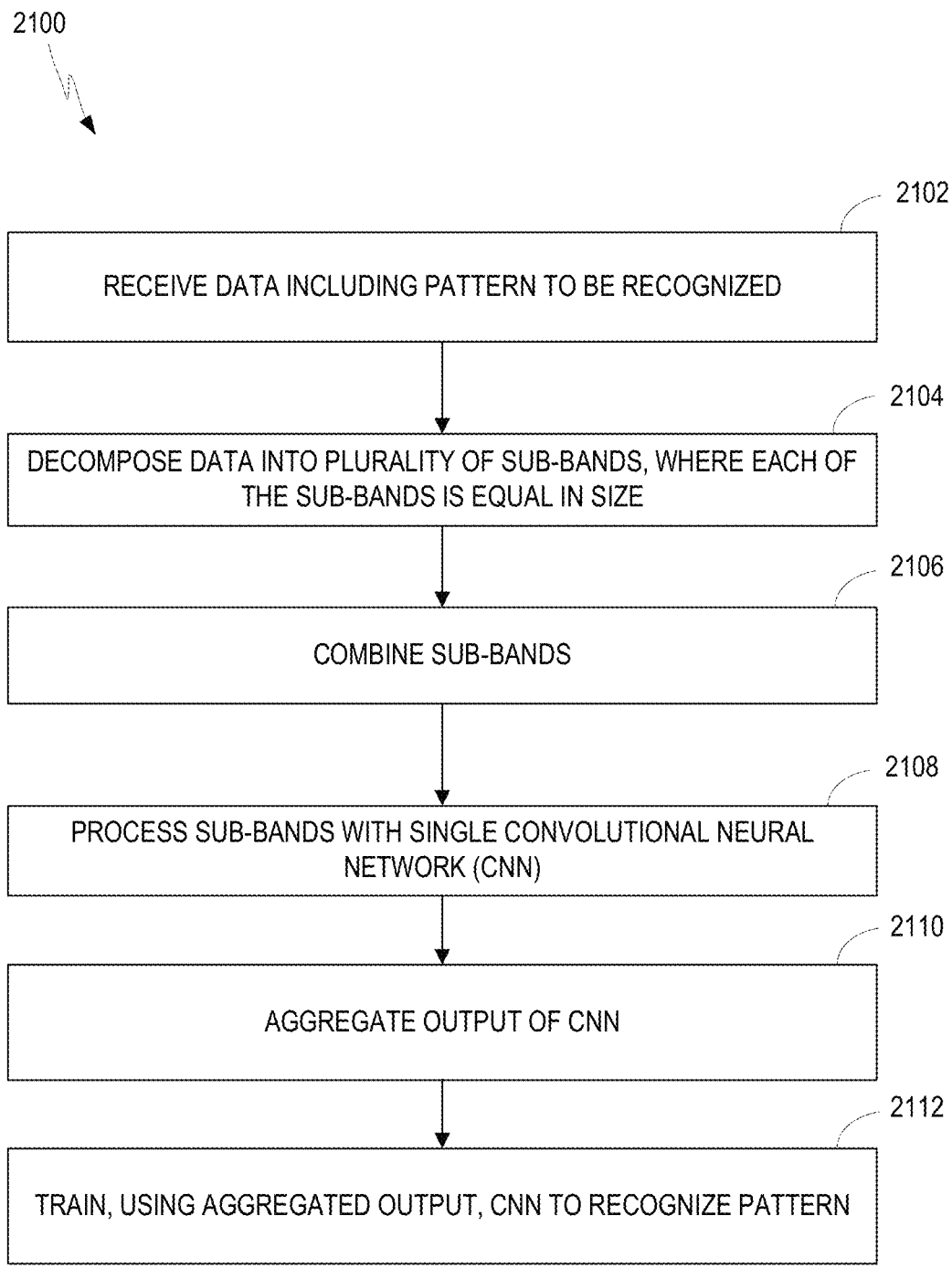
FIG. 21 is a flowchart illustrating an example process for operating a machine learning architecture with a single CNN in accordance with some aspects of the disclosure.

FIG. 21 is a flowchart illustrating an example process 2100 for operating a machine learning architecture with a single CNN in accordance with some aspects of the disclosure. The process 2100 may take place within a processing circuit (e.g., the processing circuit 908 of FIG. 9), which may be located in a suitable apparatus (e.g., apparatus 900, SSR-CNN 800). Of course, in various aspects within the scope of the disclosure, the process 2100 may be implemented by any suitable apparatus capable of supporting machine learning operations.

At block 2102, an apparatus (e.g., a machine learning architecture and/or a processing circuit) receives data including a pattern to be recognized. For example, the data can be any of one dimensional (e.g., voice/audio or communication signals), two dimensional (e.g., image), and/or three dimensional (e.g., video). In one example, the data is an image including one or more patterns.

At block 2104, the apparatus decomposes the data into a plurality of sub-bands, where each of the sub-bands is equal in size. In one aspect, a sub-band decomposition block/circuit/module (e.g., 104, 204, 304, 404, 704, 804, or 912) can perform this function. In one aspect, the sub-band decomposition block/circuit/module includes a plurality of filters with fixed settings. In one aspect, the sub-band decomposition block/circuit/module includes a plurality of filters with adjustable settings, and the settings may be periodically modified using feedback in the form of training data from one or more CNNs. In one aspect, prior to the decomposition of block 2104, the apparatus performs data pre-processing as needed. Sometimes, depending on the application, input data could be massaged before sending it to the CNN, including things like de-noising, subtracting any bias present in the signal or normalizing the signal can be done, and in certain applications they give better performance.

At block 2106, the apparatus combines the plurality of sub-bands.

At block 2108, the apparatus processes the combined sub-bands with a single CNN. In one aspect, a single sub-band channel block/circuit/module (e.g., 812 or 914) having a single CNN can perform this function.

At block 2110, the apparatus aggregates the output of the CNNs. In one aspect, one or more fully connected layers (e.g., 814-X) can perform this function.

At block 2112, the apparatus trains, using the aggregated output, the CNNs to recognize the pattern. In one aspect, the sub-band channel block/circuit/module (e.g., 812 or 914), possibly in conjunction with a back propagation path, can perform this function.

In one aspect, the process further includes mixing, after the sub-band decomposition at block 2104, the plurality of sub-bands to form a plurality of mixed sub-bands. In such case, at block 2106, the apparatus combines and then processes the mixed sub-bands.

In one aspect, additional functions, such as those described above for the machine learning architectures of FIGS. 1-9, can be performed as part of this process.

Third Example Process

Figure 22:
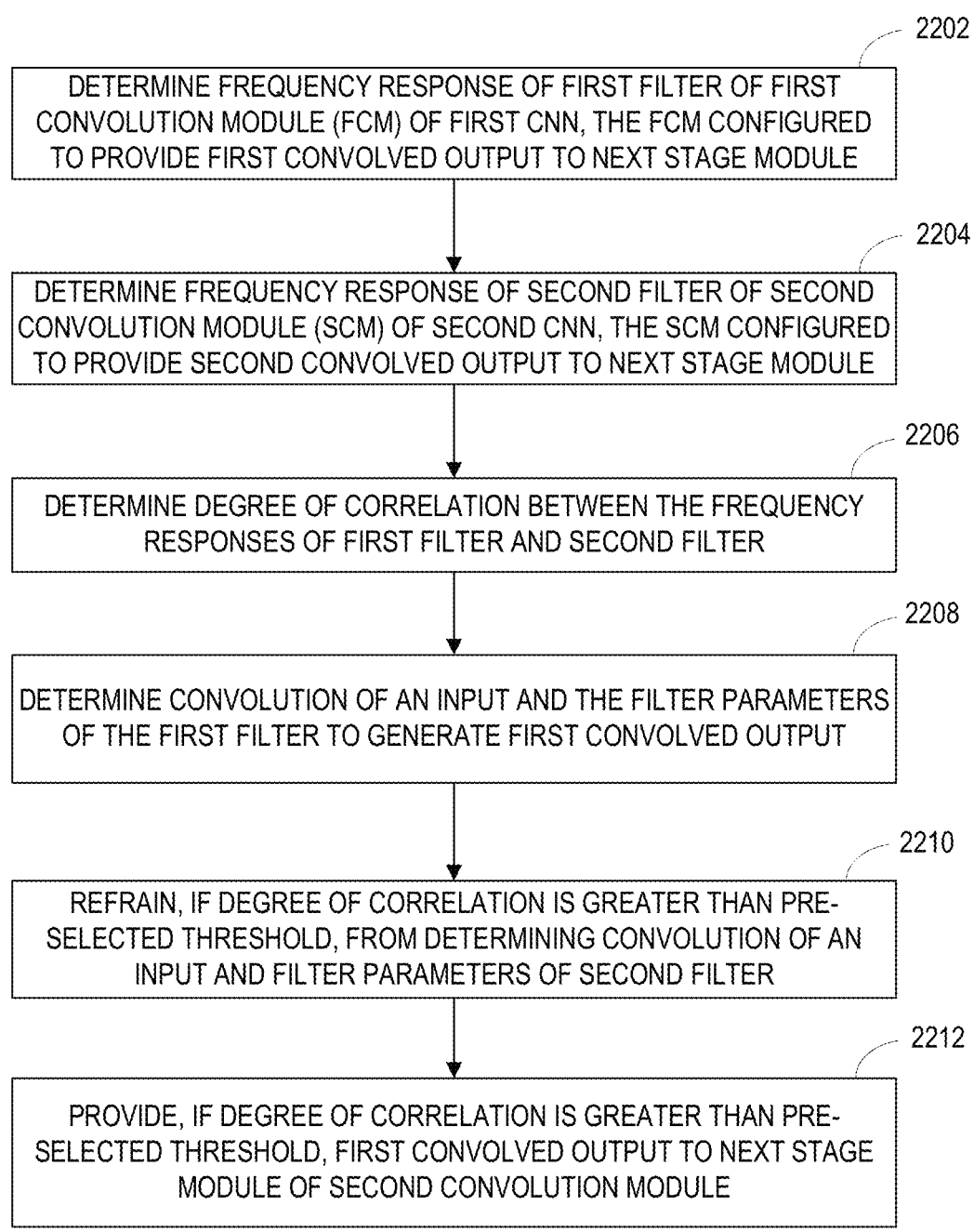
FIG. 22 is a flowchart illustrating an example process for operating a machine learning architecture to compute similar filters in accordance with some aspects of the disclosure.

FIG. 22 is a flowchart illustrating an example process for operating a machine learning architecture to compute similar filters in accordance with some aspects of the disclosure. The process 2200 may take place within a processing circuit (e.g., the processing circuit 908 of FIG. 9), which may be located in a suitable apparatus (e.g., (e.g., apparatus 900, SRCNN 100, or MSR-CNN 700, SSR-CNN 800, apparatus 1700). Of course, in various aspects within the scope of the disclosure, the process 2200 may be implemented by any suitable apparatus capable of supporting machine learning operations.

At block 2202, an apparatus (e.g., a machine learning architecture and/or a processing circuit) determines a frequency response of a first filter of a first convolution module of a first CNN, the first convolution module configured to provide a first convolved output to a next stage module. In one aspect, a processing block/circuit/module (e.g., 908) can perform this function.

At block 2204, the apparatus determines a frequency response of a second filter of a second convolution module of a second CNN, the second convolution module configured to provide a second convolved output to a next stage module. In one aspect, a processing block/circuit/module (e.g., 908) can perform this function.

At block 2206, the apparatus determines a degree of correlation between the frequency responses of the first filter and the second filter.

At block 2208, the apparatus determines a convolution of an input and the filter parameters of the first filter to generate the first convolved output.

At block 2210, the apparatus refrains, if the degree of correlation is greater than a pre-selected threshold, from determining a convolution of an input and the filter parameters of the second filter.

At block 2212, the apparatus provides, if the degree of correlation is greater than the pre-selected threshold, the first convolved output to the next stage module of the second convolution module.

In one aspect, apparatus determines the degree of correlation between the frequency responses of the first filter and the second filter by determining a normalized frequency response for each of the first filter and the second filter, determining a magnitude of each of the normalized frequency responses, and determining the degree of correlation between the normalized magnitudes of the frequency responses of the first filter and the second filter. In one aspect, the providing, if the degree of correlation is greater than the pre-selected threshold, the first convolved output to the next stage module of the second convolution module comprises scaling the first convolved output by a preselected gain, and providing the scaled first convolved output to the next stage module of the second convolution module.

In one aspect, the determining the degree of correlation between the frequency responses of the first filter and the second filter comprises determining a phase response matrix of each of the first filter and the second filter, determining a normalized frequency response for each of the first filter and the second filter, determining a magnitude of each of the normalized frequency responses, and determining the degree of correlation based on the normalized magnitudes of the frequency responses and the phase response matrices of the first filter and the second filter.

In one aspect, an example process for identifying two filters having similar frequency response could proceed as follows. First, the process computes the frequency response of the two filters. Second, the process normalizes the frequency response of each of the filter responses by their individual norm. Then, the process computes the magnitude of the normalized frequency response of the two filters. Then, the process computes the correlation of the normalized-magnitude of the two frequency responses of the filters. Then, the process can compare the correlation value to a pre-determined threshold. If the comparison is greater than a preselected threshold, then the two filters could be considered to be similar.

In one variation, along with magnitude response, the phase response matrix could also be considered, or combination of both. In another variation, the CNN network could be fine-tuned by training after similar filters have been identified. In one aspect, at inference, the process could only convolve the input with unique filters and reuse the convolved outputs where similar filters have been identified. In one aspect, the process could apply a scalar gain to the individual outputs of convolution with the norm of the original filter being replaced. Since the comparison of the filters was made based on normalized frequency responses, the actual filter gain, at inference, will vary by the same amount the filter was normalized by, i.e. the norm of the similar response. In one aspect, the CNN network could avoid the scaling factor at inference and re-train the network to not have the scaling factor after convolution.

In one aspect, two normalized filters could be similar, however they might have a different normalizing factor (e.g., have different gains). In operation, same or similar filters are identified such that only unique filter computations need to be performed and a gain is to be applied as appropriate to each of the resulting convolved output.

Fifth Example Machine Learning Architecture—OFDM Receiver

Figure 23:
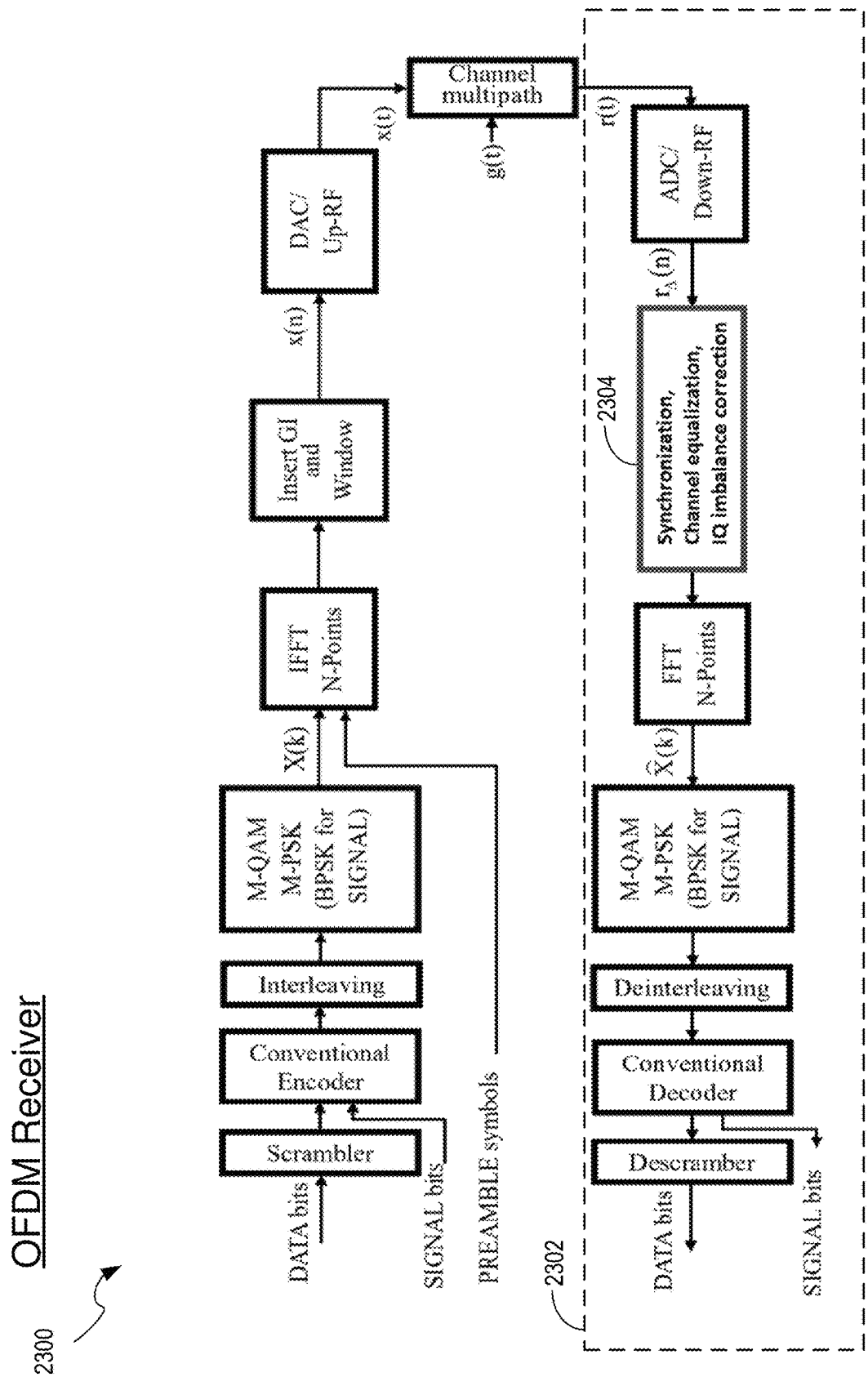
FIG. 23 is a block diagram illustrating an orthogonal frequency division multiplexing (OFDM) transceiver, including an OFDM receiver that can employ a machine learning architecture for various functions in accordance with some aspects of the disclosure.

FIG. 23 is a block diagram illustrating an orthogonal frequency division multiplexing (OFDM) transceiver 2300, including an OFDM receiver 2302 that can employ a machine learning architecture for various functions in accordance with some aspects of the disclosure. The OFDM receiver 2302 includes a block 2304 responsible for synchronization (e.g., receiver synchronization), channel equalization, and IQ imbalance correction. In block 2304, one or more of the machine learning architectures presented herein (100, 700, 800) may be employed to improve performance of these functions, as is described below.

As to synchronization, a communication system communicates in the form of data packets. Each packet has start of packet, control and command section and finally the data section followed by the end of transmission (e.g., 802.11 HT packet frame). A receiver generally needs to synchronize itself and align with the received bits to correctly retrieve the frame structure of the received packets. The receiver generally needs to predict correctly the input sample that correctly indicates the start and stop positions of every section in the packet.

As to channel estimation and equalization, wireless channel models can have multipath characteristics in them which can require accurate estimation of the channel and correction to be properly implemented in order to receive meaningful bits at the receiver. Channel equalization involves correctly predicting the coefficients of a filter that upon convolving with the input data stream can inverse the effects of a wireless communication channel. This may nullify the effect of the wireless channel on the communication system. The effect of the channel is often time varying and hence the solution also may need to be time varying.

As to IQ imbalance and correction, the difference in physical parameters in the components used for frequency down conversion in a receiver may cause imbalance in amplitude and/or phase between the I and Q signals, also known as IQ imbalance. IQ imbalance ultimately cripples image rejection in a receiver pipeline. The net error in the received signal is a function of multiple parameters, and the result is IQ gain and phase mismatch. IQ imbalance causes subcarriers to suffer interference from its mirror image. The correction is done by predicting accurately the gain and bias corrections for I and Q data streams.

As described in further detail below, this disclosure addresses the problems of receiver synchronization, channel estimation-and-correction and IQ imbalance correction by using any of the machine learning architectures with CNNs described above (e.g., 100, 200, 300, 400, 700 and 800). The ML/CNN models are robust and can model highly complex non-linear functions if adequate training has been performed.

Figure 24:
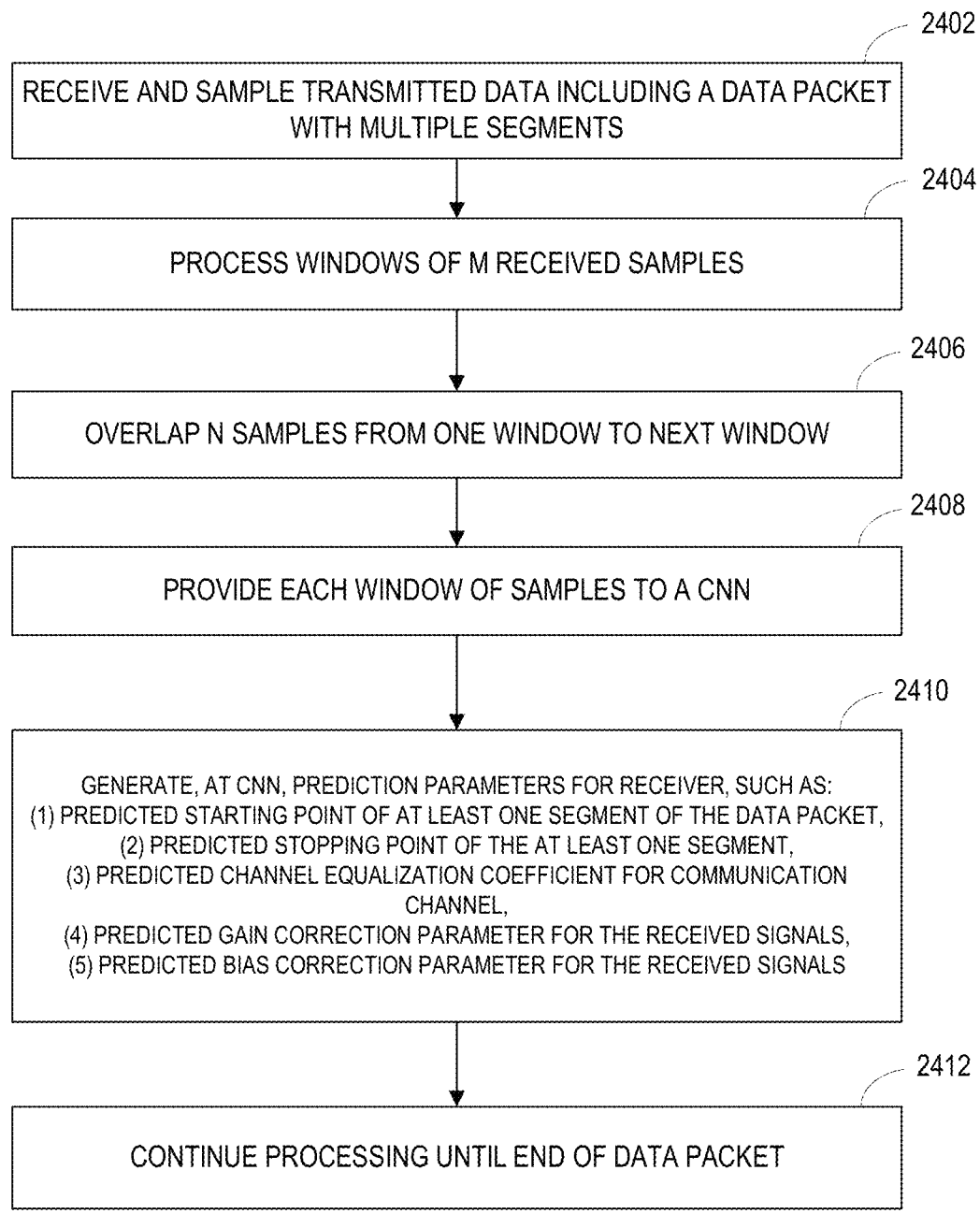
FIG. 24 is a flowchart illustrating an example process for operating an OFDM receiver that can employ a machine learning architecture for various functions in accordance with some aspects of the disclosure.

FIG. 24 is a flowchart illustrating an example process 2400 for operating an OFDM receiver that can employ a machine learning architecture for various functions in accordance with some aspects of the disclosure. The process 2400 may take place within a processing circuit (e.g., the processing circuit 908 of FIG. 9 or block 2304 of FIG. 23), which may be located in, or in conjunction with, a suitable apparatus (e.g., apparatus 900, SRCNN 100, or MSR-CNN 700, SSR-CNN 800, apparatus 1700). Of course, in various aspects within the scope of the disclosure, the process 2400 may be implemented by any suitable apparatus capable of supporting machine learning operations.

At block 2402, the receiver receives and samples incoming or transmitted data which includes a transmission data packet with multiple segments (e.g., packet sections). In one aspect, the transmitted data is received continuously and sampled as it is received. In one aspect, the receiver (e.g., 2302) can receive signals (e.g., r(t) or g(t) in FIG. 23) containing a data packet including a plurality of segments encoded using OFDM on a first communication channel (e.g., multipath channel, g(t) in FIG. 23).

At block 2404, the receiver processes windows of M received samples. In one aspect, M could depend on an estimate of the time varying nature of the transmission channel. In one aspect, the windows can include first and second windows of a first preselected number of samples (e.g., M samples).

At block 2406, the receiver overlaps N samples (e.g., a second preselected number of samples) from one window (e.g., the first window) to the next window (e.g., the second window). In one aspect, N may be varied depending on the application and the transmission bandwidth.

At block 2408, the receiver provides each window of samples to a CNN (e.g., a CNN in the sub-band channels (106-X, 712-X) of FIG. 1 or 7). In one aspect, the process skips blocks 2404 and 2406, and merely provides an entire received data packet to the CNN.

At block 2410, the receiver generates, using the CNN, a prediction parameter for the receiver. The prediction parameter could be any of (1) a predicted starting point of at least one segment of the data packet, (2) a predicted stopping point of the at least one segment, (3) a predicted channel equalization coefficient for a first communication channel of the receiver, (4) a predicted gain correction parameter for the received signals, and/or (5) a predicted bias correction parameter for the received signals. In one aspect, each CNN/ML can predict the starting point the starting point to indicate the start and stop samples of every segment of the transmission packet. In one aspect, the CNN also predicts the channel equalization coefficients required to nullify the effects of the channel by convolving the input data stream to generate a filtered input data stream. In one aspect, the CNN predicts the gain and bias correction parameters for both the I and Q data streams of the received signals.

At block 2412, the receiver continues processing until the end of the data packet.

In one aspect, training is done through back propagation. During training, data augmentation can be applied where the same transmission can be trained for varying SNR levels to increase training samples. Variation in different parameters is to be exercised during training (packet types, packet size, SNR levels, channel variation, IQ degradation levels). As a result, the trained CNN will be robust.

In one aspect, the receiver can be configured to receive signals containing a data packet including a plurality of segments encoded using OFDM on a first communication channel. The receiver can include any on of the machine learning architectures of FIG. 1 or 7. In one aspect, machine learning architecture includes a processor that is configured to receive data including a pattern to be recognized, and the data comprises the data packet. In one aspect, the processor is further configured to generate a predicted parameter of the receiver including one or more of: (1) a predicted starting point of at least one segment of the plurality of segments of the data packet, (2) a predicted stopping point of the at least one segment, (3) a predicted channel equalization coefficient for the first communication channel, (4) a predicted gain correction parameter for the received signals, and/or (5) a predicted bias correction parameter for the received signals.

In one aspect, the process 2400 may be used in conjunction with the process 1000. For example, in one aspect, the actions of blocks 2402, 2404, 2406 and 2408 can be considered as sub-actions of block 1002 of FIG. 10. In such case, the outputs of blocks 2406 and/or 2408 can be provided to block 1004 of FIG. 10 where those outputs can be used in decomposition. For example, in one aspect, block 1004 can decompose the data it receives into the plurality of sub-bands, where the received data includes the first window, second window, and the overlapped samples. In one aspect, the actions of block 2410 and/or 2412 can be performed in any of blocks 1006, 1008, and/or 1010. In one aspect, the pattern recognized in block 1010 can be the predicted parameter of block 2410.

Other Aspects

Example machine learning architectures with particular CNNs are shown in FIGS. 1, 7, 8, and 17. While these particular CNNs are used in these examples, and possibly per sub-band, it should be noted that other CNNs could be used. For example, in one aspect, just about any known CNN or even unknown CNN could be used. In addition, the CNN for each of the sub-bands do not have to be identical. That is, a different CNN architecture could be used for processing sub-band LL and a different CNN could be used for processing sub-band HH, HL, LH or HH.

Several examples described above involve an equal division of sub-bands during decomposition. In other aspects, the sub-bands may be divided unequally. As an example, suppose we decompose an input image of dimension 100× 100 into two layers. At the first layer, the image could be decomposed into 4 sub-bands each with dimension 50×50. At the second layer, each of the 50×50 images could be decomposed further into four 25×25 images. This would give us a total of 16 decomposed images of dimension 25×25. In a first example of unequal division, one could have an a-priory knowledge that certain sub-bands, among the 16 sub-bands do not have useful information content and as a result, the parent sub-band in layer-1 of that particular sub-band of layer-2 is not decomposed further. This could result in 3 sub-bands of layer-1 being decomposed into 4 sub-bands each, while one sub-band of layer-1 is not decomposed. This gives rise to 12 images of size 25×25 and one image of size 50×50. In this case, each of the 13 unequally divided sub-bands could either be processed by a single CNN (e.g., by ML architecture 800 of FIG. 8) or by an independent CNN for each of the sub-bands (e.g., by ML architecture 100 of FIG. 1 or ML architecture 700 of FIG. 7). For example, in this first example, one could group 11 sub-bands of the 16 sub-bands to be processed in a single CNN (e.g., by ML architecture 800 of FIG. 8) and rest of the 5 sub-bands could be processed by independent CNNs (e.g., by ML architecture 100 of FIG. 1 or ML architecture 700 of FIG. 7). In one example, one could combine the above examples, where 5 equal sub-bands of size 25×25 and the single sub-band of size 50×50 are processed by independent sub-bands while the rest are grouped (7 sub-bands) and processed by a single CNN. In one aspect, each of the above examples can be processed by any CNN. In the scenario where each of the sub-bands are being processed by an independent CNN, each of the sub-bands could be processed by a different kind of CNN.

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for pattern recognition, comprising:
    a memory; and
    a processor coupled to the memory and configured to:
        receive data comprising a pattern to be recognized;
        decompose the data into a plurality of sub-bands using an adaptive transform;
        process each of the plurality of sub-bands with a respective convolutional neural network (CNN) to generate a plurality of outputs, wherein each of the CNNs operates independently of the other CNNs;
        aggregate the outputs of the CNNs;
        train, using the aggregated output, the adaptive transform; and
        train, using the aggregated output, the CNNs to recognize the pattern.

2. The apparatus of claim 1, wherein each of the CNNs is configured to generate a respective output using information from the respective sub-band and without using information from any of the other sub-bands.

3. The apparatus of claim 1, wherein the data comprises an image.

4. The apparatus of claim 1, wherein the processor is further configured to decompose the data into the plurality of sub-bands such that each of the plurality of sub-bands is equal in size.

5. The apparatus of claim 1, wherein the processor is further configured to process, in parallel, each of the plurality of sub-bands with the respective CNN to generate the plurality of outputs.

6. The apparatus of claim 1, wherein the processor is further configured to:
    mix the plurality of sub-bands to form a plurality of mixed sub-bands; and
    process each of the plurality of mixed sub-bands with the respective CNN to generate the plurality of outputs.

7. The apparatus of claim 6, wherein at least one of the plurality of mixed sub-bands comprises information from two or more of the plurality of sub-bands.

8. The apparatus of claim 6, the processor is further configured to:

learn, using the aggregated output, at least one weight; and process a mixed sub-band of the plurality of mixed sub-bands to generate the plurality of outputs, wherein the mixed sub-band is weighted by the at least one weight.

9. The apparatus of claim 1, the processor is further configured to:
encode each of the plurality of sub-bands with the respective CNN to generate encoded sub-band data;
decode, for each sub-band, the encoded sub-band data with a second respective CNN to generate decoded sub-band data;
combine the decoded sub-band data for each of the sub-bands; and
generate, using the combined decoded sub-band data, an output image.

10. The apparatus of claim 1:
wherein a first CNN of the plurality of CNNs comprises a first convolution module comprising a first filter, the first convolution module configured to provide a first convolved output to a next stage module;
wherein a second CNN of the plurality of CNNs comprises a second convolution module comprising a second filter, the second convolution module configured to provide a second convolved output to a next stage module;
wherein the processor is further configured to:
determine a frequency response of each of the first filter and the second filter;
determine a degree of correlation between the frequency responses of the first filter and the second filter;
determine a convolution of an input and the filter parameters of the first filter to generate the first convolved output;
refrain, if the degree of correlation is greater than a pre-selected threshold, from determining a convolution of an input and the filter parameters of the second filter; and
provide, if the degree of correlation is greater than the pre-selected threshold, the first convolved output to the next stage module of the second convolution module.

11. The apparatus of claim 10, wherein the processor is further configured to determine the degree of correlation between the frequency responses of the first filter and the second filter by being further configured to:
determine a normalized frequency response for each of the first filter and the second filter;
determine a magnitude of each of the normalized frequency responses; and
determine the degree of correlation between the normalized magnitudes of the frequency responses of the first filter and the second filter.

12. The apparatus of claim 11, wherein the processor is further configured to provide, if the degree of correlation is greater than the pre-selected threshold, the first convolved output to the next stage module of the second convolution module by being further configured to:
scale the first convolved output by a preselected gain; and
provide the scaled first convolved output to the next stage module of the second convolution module.

13. The apparatus of claim 11, wherein the processor is further configured to determine the degree of correlation between the frequency responses of the first filter and the second filter by being further configured to:

determine a phase response matrix of each of the first filter and the second filter;
determine a normalized frequency response for each of the first filter and the second filter;
determine a magnitude of each of the normalized frequency responses; and
determine the degree of correlation based on the normalized magnitudes of the frequency responses and the phase response matrices of the first filter and the second filter.

14. The apparatus of claim 1, wherein the adaptive transform comprises at least one adaptive filter comprising an adaptive high pass filter and an adaptive low pass filter.

15. The apparatus of claim 1, wherein the adaptive transform comprises at least one adaptive filter comprising a weight that is adjustable based on a backpropagation of an error associated with the output of at least one of the CNNs.

16. The apparatus of claim 1:
wherein the adaptive transform comprises an adaptive filter; and
wherein the processor is configured to decompose the data into the plurality of sub-bands using the adaptive transform based on a training dataset and at least one adaptive filter coefficient learned during training of the adaptive filter.

17. An apparatus for pattern recognition, comprising:
a memory; and
a processor coupled to the memory and configured to:
receive data comprising a pattern to be recognized;
decompose the data into a plurality of sub-bands;
process each of the plurality of sub-bands with a respective convolutional neural network (CNN) to generate a plurality of outputs, wherein each of the CNNs operates independently of the other CNNs;
aggregate the outputs of the CNNs; and
train, using the aggregated output, the CNNs to recognize the pattern,
wherein the processor is further configured to decompose the data into the plurality of sub-bands such that the plurality of sub-bands comprises:
low frequency sub-bands have a first average degree of sparsity; and
high frequency sub-bands have a second average degree of sparsity and each have a higher frequency than the low frequency sub-bands; and
wherein the second average degree of sparsity is higher than the first average degree of sparsity.

18. An apparatus for pattern recognition, comprising:
a memory; and
a processor coupled to the memory and configured to:
receive data comprising a pattern to be recognized;
decompose the data into a plurality of sub-bands;
process each of the plurality of sub-bands with a respective convolutional neural network (CNN) to generate a plurality of outputs, wherein each of the CNNs operates independently of the other CNNs;
aggregate the outputs of the CNNs; and
train, using the aggregated output, the CNNs to recognize the pattern,
wherein a first CNN of the respective CNNs comprises a first type of CNN; and
wherein a second CNN of the respective CNNs comprises a second type of CNN that is different from the first type of CNN.

19. A receiver configured to receive signals containing a data packet comprising a plurality of segments encoded using orthogonal frequency division multiplexing (OFDM) on a first communication channel, the receiver comprising:
the apparatus of claim 1;
wherein the received data comprising the pattern to be recognized comprises the data packet; and
wherein the processor is further configured to:
process a first window and a second window of samples of the received signals, each with a first preselected number of samples;
overlap a second preselected number of samples of the first window and the second window;
decompose the data into the plurality of sub-bands, wherein the data comprises the first window, second window, and the overlapped samples; and
generate a predicted parameter of the receiver comprising at least one of: a predicted starting point of at least one segment of the plurality of segments of the data packet, a predicted stopping point of the at least one segment, a predicted channel equalization coefficient for the first communication channel, a predicted gain correction parameter for the received signals, or a predicted bias correction parameter for the received signals.

20. A method for pattern recognition, comprising:
receiving data comprising a pattern to be recognized;
decomposing the data into a plurality of sub-bands using an adaptive transform;
processing each of the plurality of sub-bands with a respective convolutional neural network (CNN) to generate a plurality of outputs, wherein each of the CNNs operates independently of the other CNNs;
aggregating the outputs of the CNNs;
training, using the aggregated output, the adaptive transform; and
training, using the aggregated output, the CNNs to recognize the pattern.

21. The method of claim 20, wherein each of the CNNs is configured to generate a respective output using information from the respective sub-band and without using information from any of the other sub-bands.

22. The method of claim 20, wherein the data comprises an image.

23. The method of claim 20, wherein the decomposing the data into the plurality of sub-bands comprises decomposing the data into the plurality of sub-bands such that each of the plurality of sub-bands is equal in size.

24. The method of claim 20, wherein the decomposing the data into the plurality of sub-bands comprises decomposing the data into the plurality of sub-bands such that the plurality of sub-bands comprises:
low frequency sub-bands have a first average degree of sparsity; and
high frequency sub-bands have a second average degree of sparsity and each have a higher frequency than the low frequency sub-bands; and
wherein the second average degree of sparsity is higher than the first average degree of sparsity.

25. The method of claim 20, wherein the processing each of the plurality of sub-bands with the respective CNN to generate the plurality of outputs comprises processing, in parallel, each of the plurality of sub-bands with the respective CNN to generate the plurality of outputs.

26. The method of claim 20:
wherein a first CNN of the respective CNNs comprises a first type of CNN; and
wherein a second CNN of the respective CNNs comprises a second type of CNN that is different from the first type of CNN.

27. The method of claim 20, further comprising:
mixing the plurality of sub-bands to form a plurality of mixed sub-bands; and
wherein the processing each of the plurality of sub-bands with the respective CNN to generate the plurality of outputs comprises processing each of the plurality of mixed sub-bands with the respective CNN to generate the plurality of outputs.

28. The method of claim 27, wherein at least one of the plurality of mixed sub-bands comprises information from two or more of the plurality of sub-bands.

29. The method of claim 27, further comprising:
learning, using the aggregated output, at least one weight; and
wherein the processing each of the plurality of mixed sub-bands with the respective CNN to generate the plurality of outputs comprises processing a mixed sub-band of the plurality of mixed sub-bands to generate the plurality of outputs, wherein the mixed sub-band is weighted by the at least one weight.

30. The method of claim 20:
wherein the processing each of the plurality of sub-bands with the respective CNN to generate a plurality of outputs comprises:
encoding each of the plurality of sub-bands with the respective CNN to generate encoded sub-band data; and
decoding, for each sub-band, the encoded sub-band data with a second respective CNN to generate decoded sub-band data; and
wherein the aggregating the outputs of the CNNs comprises:
combining the decoded sub-band data for each of the sub-bands; and
generating, using the combined decoded sub-band data, an output image.

31. The method of claim 20:
wherein a first CNN of the plurality of CNNs comprises a first convolution module comprising a first filter, the first convolution module configured to provide a first convolved output to a next stage module;
wherein a second CNN of the plurality of CNNs comprises a second convolution module comprising a second filter, the second convolution module configured to provide a second convolved output to a next stage module;
the method further comprising:
determining a frequency response of each of the first filter and the second filter;
determining a degree of correlation between the frequency responses of the first filter and the second filter;
determining a convolution of an input and the filter parameters of the first filter to generate the first convolved output;
refraining, if the degree of correlation is greater than a pre-selected threshold, from determining a convolution of an input and the filter parameters of the second filter; and
providing, if the degree of correlation is greater than the pre-selected threshold, the first convolved output to the next stage module of the second convolution module.

32. The method of claim 31, wherein the determining the degree of correlation between the frequency responses of the first filter and the second filter comprises:
 determining a normalized frequency response for each of the first filter and the second filter;
 determining a magnitude of each of the normalized frequency responses; and
 determining the degree of correlation between the normalized magnitudes of the frequency responses of the first filter and the second filter.

33. The method of claim 32, wherein the providing, if the degree of correlation is greater than the pre-selected threshold, the first convolved output to the next stage module of the second convolution module comprises:
 scaling the first convolved output by a preselected gain; and
 providing the scaled first convolved output to the next stage module of the second convolution module.

34. The method of claim 31, wherein the determining the degree of correlation between the frequency responses of the first filter and the second filter comprises:
 determining a phase response matrix of each of the first filter and the second filter;
 determining a normalized frequency response for each of the first filter and the second filter;
 determining a magnitude of each of the normalized frequency responses; and
 determining the degree of correlation based on the normalized magnitudes of the frequency responses and the phase response matrices of the first filter and the second filter.

35. The method of claim 20:
 wherein the receiving data comprising the pattern to be recognized comprises receiving signals containing a data packet comprising a plurality of segments encoded using orthogonal frequency division multiplexing (OFDM) on a first communication channel; and
 wherein the method further comprises:
  processing a first window and a second window of samples of the received signals, each with a first preselected number of samples;
  overlapping a second preselected number of samples of the first window and the second window;
  decomposing the data into the plurality of sub-bands, wherein the data comprises the first window, second window, and the overlapped samples; and
  generating a predicted parameter selected from the group consisting of: a predicted starting point of at least one segment of the plurality of segments of the data packet, a predicted stopping point of the at least one segment, a predicted channel equalization coefficient for the first communication channel, a predicted gain correction parameter for the received signals, a predicted bias correction parameter for the received signals, and combinations thereof.

36. The method of claim 20, wherein the adaptive transform comprises at least one adaptive filter comprising an adaptive high pass filter and an adaptive low pass filter.

37. The method of claim 20, wherein the adaptive transform comprises at least one adaptive filter comprising a weight that is adjustable based on a backpropagation of an error associated with the output of at least one of the CNNs.

38. The method of claim 20:
 wherein the adaptive transform comprises an adaptive filter; and
 wherein the decomposing the data into the plurality of sub-bands using the adaptive transform comprises decomposing the data based on a training dataset and at least one adaptive filter coefficient learned during training of the adaptive filter.

39. A method for computing filters, comprising:
 determining a frequency response of a first filter of a first convolution module of a first convolutional neural network (CNN), the first convolution module configured to provide a first convolved output to a next stage module;
 determining a frequency response of a second filter of a second convolution module of a second CNN, the second convolution module configured to provide a second convolved output to a next stage module;
 determining a degree of correlation between the frequency responses of the first filter and the second filter;
 determining a convolution of an input and the filter parameters of the first filter to generate the first convolved output;
 refraining, if the degree of correlation is greater than a pre-selected threshold, from determining a convolution of an input and the filter parameters of the second filter; and
 providing, if the degree of correlation is greater than the pre-selected threshold, the first convolved output to the next stage module of the second convolution module.

40. A method for pattern recognition, comprising:
 receiving data comprising a pattern to be recognized;
 decomposing the data into a plurality of sub-bands using an adaptive transform, wherein each of the plurality of sub-bands is equal in size;
 combining the plurality of sub-bands;
 processing the combined sub-bands with a single convolutional neural network (CNN);
 generating an output at the CNN;
 training, using the generated output, the adaptive transform; and
 training, using the generated output, the CNN to recognize the pattern.

* * * * *